United States Patent
Harris, III

(10) Patent No.: US 10,305,078 B1
(45) Date of Patent: May 28, 2019

(54) BATTERY MODULE WITH VENT PATH

(71) Applicant: Thor Trucks Inc., North Hollywood, CA (US)

(72) Inventor: John Henry Harris, III, San Gabriel, CA (US)

(73) Assignee: Thor Trucks Inc., North Hollywood, CA (US)

(*) Notice: Subject to any disclaimer, the term of this patent is extended or adjusted under 35 U.S.C. 154(b) by 26 days.

(21) Appl. No.: 15/948,547

(22) Filed: Apr. 9, 2018

Related U.S. Application Data

(60) Provisional application No. 62/626,047, filed on Feb. 3, 2018.

(51) Int. Cl.
| | |
|---|---|
| *H01M 2/10* | (2006.01) |
| *H01M 10/653* | (2014.01) |
| *H01M 10/647* | (2014.01) |
| *H01M 10/625* | (2014.01) |
| *H01M 10/613* | (2014.01) |
| *H01M 10/6567* | (2014.01) |
| *H01M 10/643* | (2014.01) |
| *H01M 2/12* | (2006.01) |

(52) U.S. Cl.
CPC ....... *H01M 2/1252* (2013.01); *H01M 2/1077* (2013.01)

(58) Field of Classification Search
CPC .... H01M 2/10; H01M 2/1077; H01M 10/653; H01M 10/647; H01M 10/625; H01M 10/613; H01M 10/6567; H01M 10/643
See application file for complete search history.

(56) References Cited

U.S. PATENT DOCUMENTS

| | | |
|---|---|---|
| 6,399,238 B1 | 6/2002 | Oweis et al. |
| 6,406,812 B1 | 6/2002 | Dreulle et al. |
| 9,525,291 B1 | 12/2016 | Huynh et al. |
| 9,595,705 B1 | 3/2017 | Buckhout |
| 9,692,095 B2 | 6/2017 | Harris |
| 9,692,096 B2 | 6/2017 | Harris |
| 2008/0003495 A1 | 1/2008 | Shimizu |
| 2010/0000816 A1 | 1/2010 | Okada |
| 2012/0048630 A1 | 3/2012 | Nishiura et al. |
| 2012/0148889 A1* | 6/2012 | Fuhr .......... H01M 2/1077 429/87 |
| 2012/0177970 A1 | 7/2012 | Marchio et al. |
| 2012/0247848 A1 | 10/2012 | Kosaka et al. |
| 2012/0282507 A1 | 11/2012 | Andre et al. |

(Continued)

*Primary Examiner* — Karie O'Neill Apicella
(74) *Attorney, Agent, or Firm* — Arent Fox LLP

(57) ABSTRACT

Aspects of a modular clip for an electric battery, a battery module comprising multiple of such modular clips, and a battery pack comprising multiple battery modules are provided. The modular clip is configured to receive a plurality of battery cells and includes a base portion and a first and second wall extending from the base portion along a length of the modular clip. The plurality of battery cells may be received between the first wall and the second wall of the modular clip. A plurality of openings may be formed in the base portion of the modular clip, each opening being configured to extend around a bottom vent of a battery cell. Channels may also be formed in the base portion and/or base plate that are configured to enable heat or gas escaping from the bottom vent of the battery cell to vent away from an interior of the modular clip.

29 Claims, 19 Drawing Sheets

(56) References Cited

U.S. PATENT DOCUMENTS

| | | |
|---|---|---|
| 2013/0164577 A1 | 6/2013 | Insana et al. |
| 2014/0205878 A1 | 7/2014 | Ohgitani et al. |
| 2016/0197386 A1 | 7/2016 | Moon et al. |
| 2017/0001584 A1 | 1/2017 | Harris et al. |
| 2017/0003082 A1 | 1/2017 | Harris |
| 2017/0005303 A1 | 1/2017 | Harris |
| 2017/0005304 A1 | 1/2017 | Harris |
| 2017/0005305 A1 | 1/2017 | Harris |
| 2017/0005315 A1 | 1/2017 | Harris et al. |
| 2017/0005319 A1 | 1/2017 | Rong |
| 2017/0005376 A1 | 1/2017 | Harris et al. |
| 2017/0005377 A1 | 1/2017 | Rong |
| 2017/0005378 A1 | 1/2017 | Rong |
| 2017/0005380 A1 | 1/2017 | Harris |
| 2017/0005384 A1 | 1/2017 | Harris et al. |
| 2017/0025657 A1 | 1/2017 | Reinshagen et al. |
| 2017/0092999 A1 | 3/2017 | Tarlau et al. |
| 2017/0133644 A1 | 5/2017 | Robert et al. |
| 2017/0217318 A1 | 8/2017 | Kowalewski |
| 2017/0244141 A1 | 8/2017 | Weicker |
| 2017/0253142 A1 | 9/2017 | Buckhout |
| 2017/0256771 A1 | 9/2017 | Buckhout et al. |
| 2017/0256826 A1 | 9/2017 | Hong et al. |
| 2017/0279104 A1 | 9/2017 | Beverley et al. |
| 2017/0288202 A1 | 10/2017 | Tarlau et al. |
| 2017/0288285 A1 | 10/2017 | Buckhout et al. |
| 2017/0288286 A1 | 10/2017 | Buckhout et al. |
| 2017/0298807 A1 | 10/2017 | Gubel et al. |
| 2017/0338527 A1 | 11/2017 | Walton |
| 2018/0006341 A1 | 1/2018 | Iqra et al. |
| 2018/0095139 A1 | 4/2018 | Buckhout, Sr. et al. |
| 2018/0097265 A1 | 4/2018 | Tarlau et al. |

\* cited by examiner

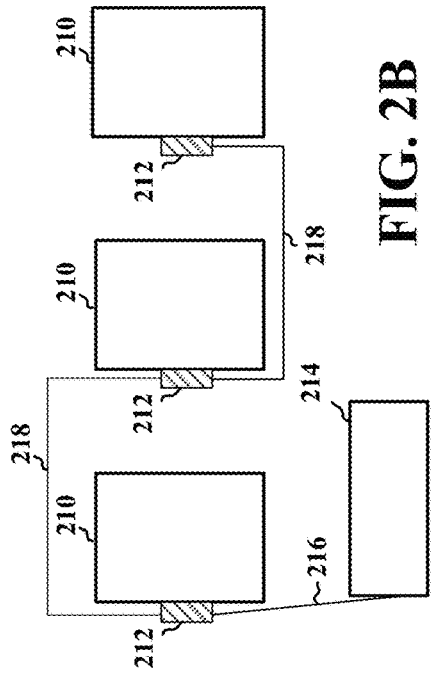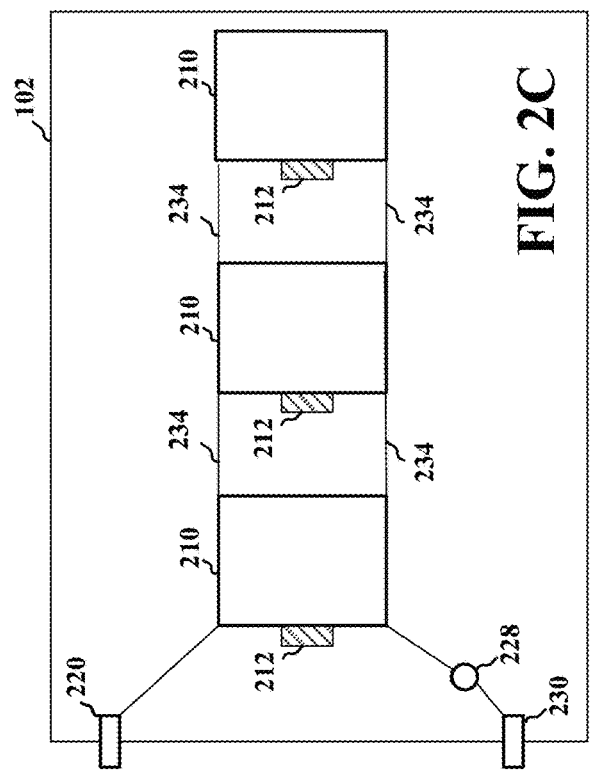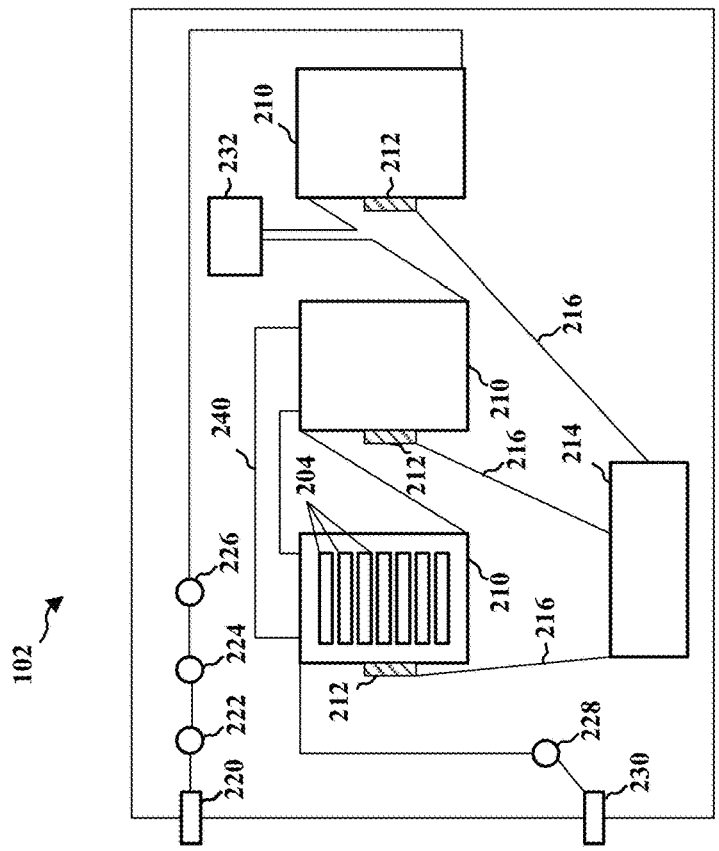

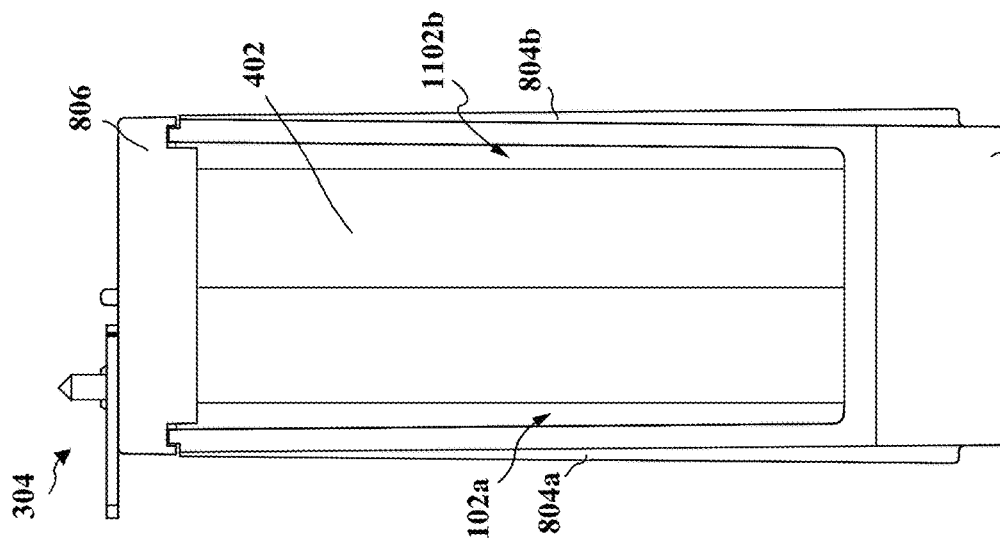
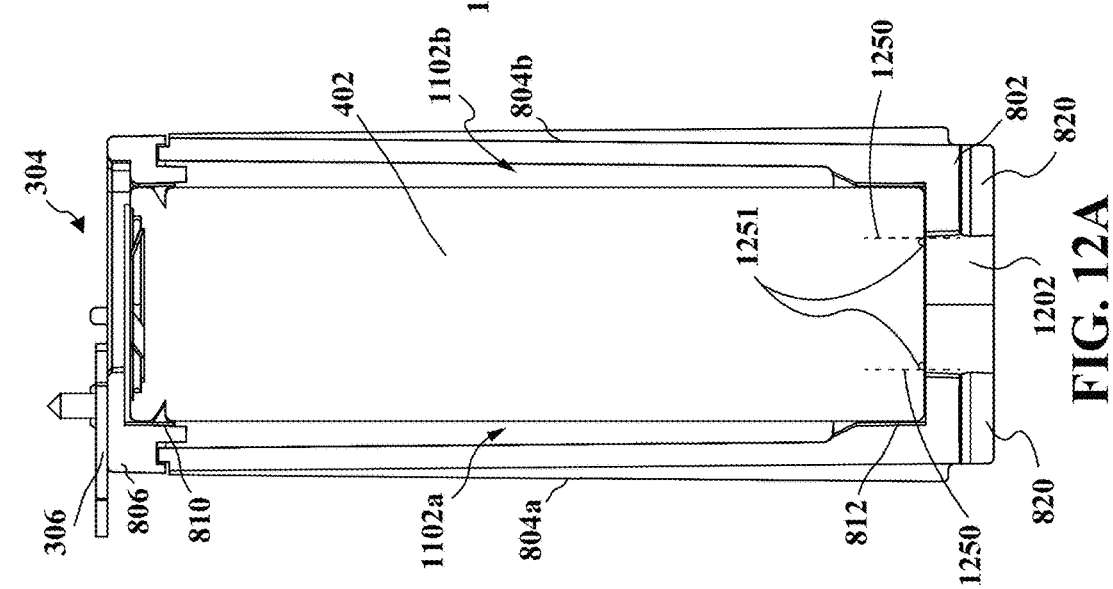

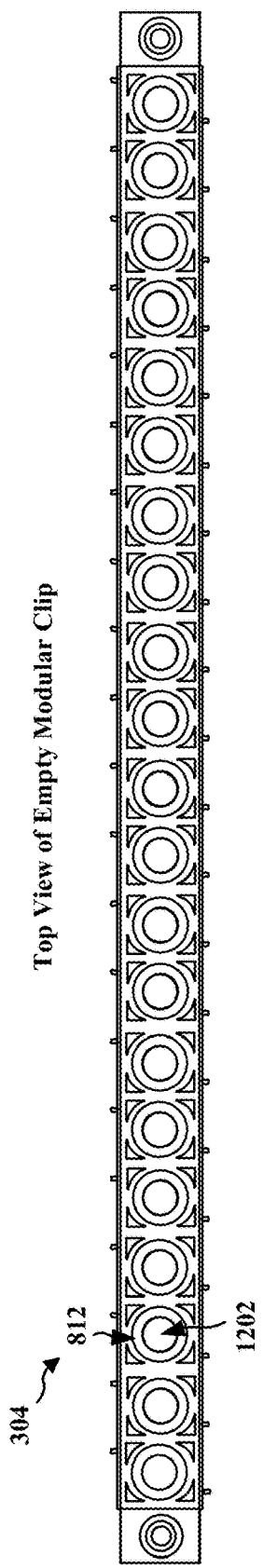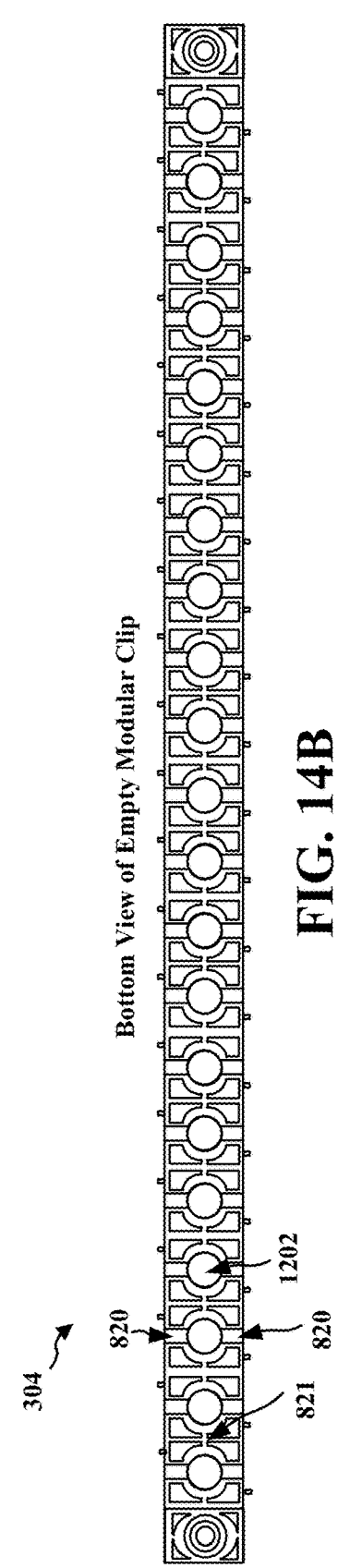
FIG. 14A — Top View of Empty Modular Clip
FIG. 14B — Bottom View of Empty Modular Clip

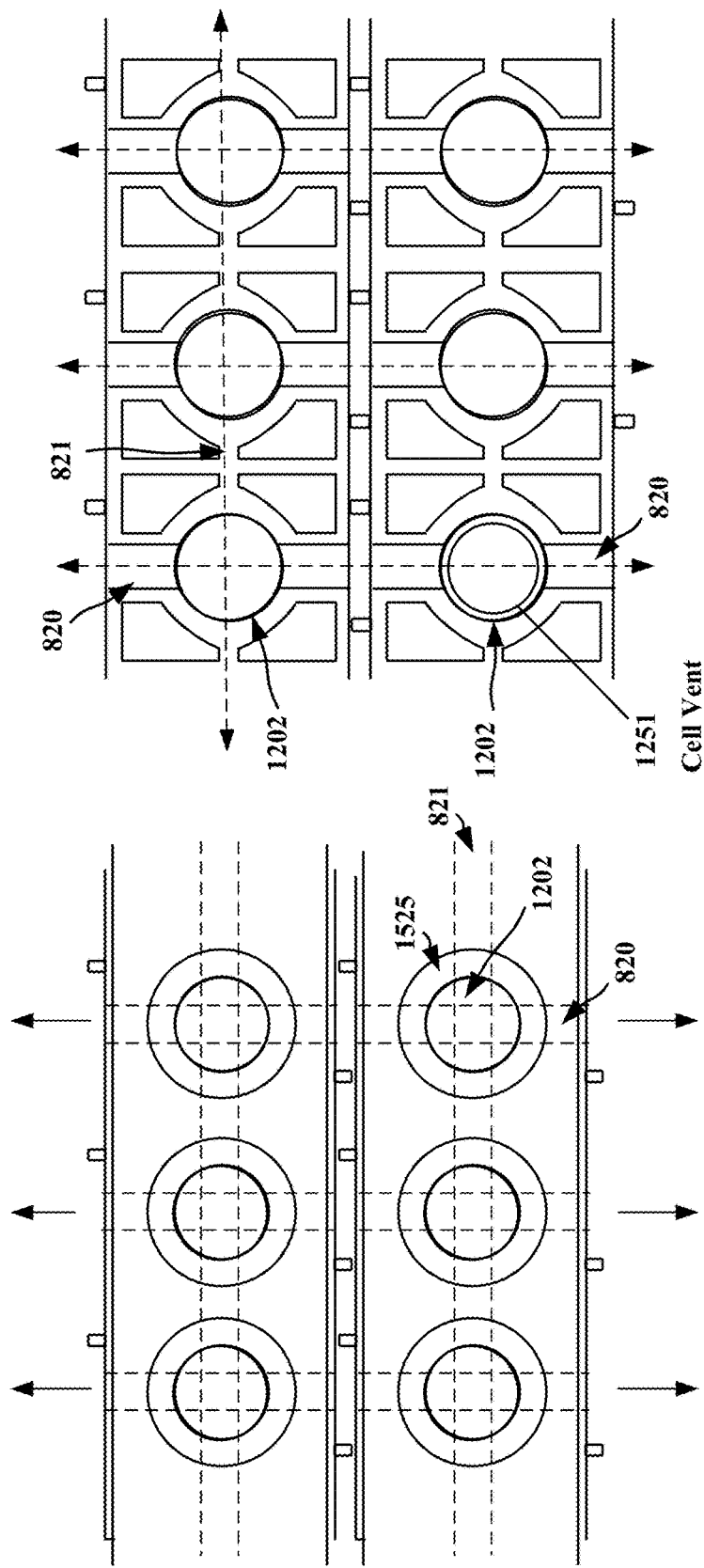

BATTERY MODULE WITH VENT PATH

CROSS-REFERENCE TO RELATED APPLICATION

This application claims the benefit of U.S. Provisional Application Ser. No. 62/626,047, entitled "Battery Module with Vent Path" and filed on Feb. 3, 2018, which is expressly incorporated by reference herein in its entirety.

BACKGROUND

Field

Aspects of the present disclosure relate generally to an electric battery module and a modular electric battery assembly.

Description of the Related Art

Electric batteries may be used in a number of applications. As one example, electric batteries may be used to power electric vehicles in place of a combustion engine in order to reduce fuel consumption and vehicle emissions. Electric batteries may also be used for energy storage systems, e.g., to store energy for utilities and/or to supply power to residential or commercial buildings. Thus, electric batteries are desirable for both mobile applications and stationary energy storage applications.

There exists a need for further improvement in electric battery technology. A battery pack can be an expensive component for an electric vehicle or an energy storage system. Greater efficiency in the manufacturing process is needed. There is a need for processes and designs that improve manufacturing efficiency and that reduce manufacturing costs. The configuration of the battery pack needs to balance a number of factors, e.g., including safety, temperature regulation, size, cost, shape, weight, manufacturing complexity, etc.

SUMMARY

In light of the above described problems, the present disclosure provides a modular clip for an electric battery module having an improved safety features, as well as a battery module comprising multiple of such modular clips, and a battery pack comprising multiple of such battery modules.

Various circumstances may cause a battery cell within a battery pack to rupture. A defective battery cell or a damaged battery cell may fail. In one example, damage due to an accident in an electric vehicle or hitting debris may lead to failure in at least one battery cell for the vehicle. The battery cell may go into thermal runaway in which temperature of the battery cell rises until the exterior of the battery cell ruptures. The rupture of the battery cell may release flame and hot gas at a very high temperature, e.g., up to and even above a temperature of 800 degrees Celsius. Additionally, the effect of one battery cell rupturing may cause damage to other battery cells, which may lead to similar thermal runaway and rupture in additional battery cells. This can create a chain reaction of damaged and rupturing battery cells that quickly engulfs the entire battery pack. An important safety feature for such battery packs is to improve the Passive Propagation Resistance.

Aspects presented herein provide a modular clip for an electric battery that is configured to improve passive propagation resistance of a modular battery clip, battery module, and battery pack.

In an aspect of the disclosure, a modular clip for a battery assembly is provided. The modular clip includes a base portion, a first wall and a second wall extending from the base portion along the length of the modular clip. The modular clip may be configured to receive a plurality of battery cells between the first wall and the second wall and may further include a plurality of openings in the base portion, wherein each opening is configured to extend around a bottom vent of a battery cell. The modular clip may further include a plurality of channels formed in the base portion of the modular clips and/or the base plate, each of the plurality of openings having at least one channel extending from the corresponding opening to an edge of the modular clip. Each channel may be configured to enable heat or gas escaping from the bottom vent of the battery cell to vent away from an interior of the modular clip. The modular clip may further include the plurality of battery cells positioned within the modular clip.

In another aspect of the disclosure, a battery module is provided. The battery module include a base plate and a plurality of modular clips coupled to the base plate. Each modular clip may include a base portion, a first wall and a second wall extending from the base portion along the length of the modular clip. The modular clip may be configured to receive a plurality of battery cells between the first wall and the second wall and may further include a plurality of openings in the base portion, wherein each opening is configured to extend around a bottom vent of a battery cell. The modular clip may further include a plurality of channels formed in the base portion of the modular clips and/or the base plate, each of the plurality of openings having at least one channel extending from the corresponding opening to an edge of the modular clip. Each channel may be configured to enable heat or gas escaping from the bottom vent of the battery cell to vent away from an interior of the modular clip. The plurality of channels may be configured to align for each of the plurality of modular clips coupled to the base plate. The battery module may further include the plurality of battery cells positioned within each of the modular clips.

In another aspect, a battery pack is provided, the battery pack comprising multiple battery modules, each battery module including a base plate and a plurality of modular clips coupled to the base plate. Each modular clip may include a base portion, a first wall and a second wall extending from the base portion along the length of the modular clip. The modular clip may be configured to receive a plurality of battery cells between the first wall and the second wall and may further include a plurality of openings in the base portion, wherein each opening is configured to extend around a bottom vent of a battery cell. The modular clip may further include a plurality of channels formed in the base portion of the modular clips and/or the base plate, each of the plurality of openings having at least one channel extending from the corresponding opening to an edge of the modular clip. Each channel may be configured to enable heat or gas escaping from the bottom vent of the battery cell to vent away from an interior of the modular clip. The plurality of channels may be configured to align for each of the plurality of modular clips coupled to the base plate. The battery pack may further include the plurality of battery cells positioned within each of the modular clips.

Additional advantages and novel features of aspects of the present invention will be set forth in part in the description that follows, and in part will become more apparent to those skilled in the art upon examination of the following or upon learning by practice thereof.

BRIEF DESCRIPTION OF THE DRAWINGS

FIGS. 2A, 2B, and 2C illustrate example aspects of a battery pack, in accordance with aspects presented herein.

FIG. 12A illustrates a cross section of an example modular clip, in accordance with aspects presented herein.

FIG. 12B illustrates an end view of an example modular clip.

FIG. 14A illustrates a top view of a modular clip, in accordance with aspects presented herein.

FIG. 14B illustrates a bottom view of a modular clip, in accordance with aspects presented herein.

FIG. 15A illustrates a view of a portion of a top view of a modular clip, in accordance with aspects presented herein.

FIG. 15B illustrates a view of a portion of a bottom view of a modular clip, in accordance with aspects presented herein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Several aspects of electric batteries, battery packs, battery modules, and modular sub-components of battery modules will now be presented with reference to various examples.

Figure 1:
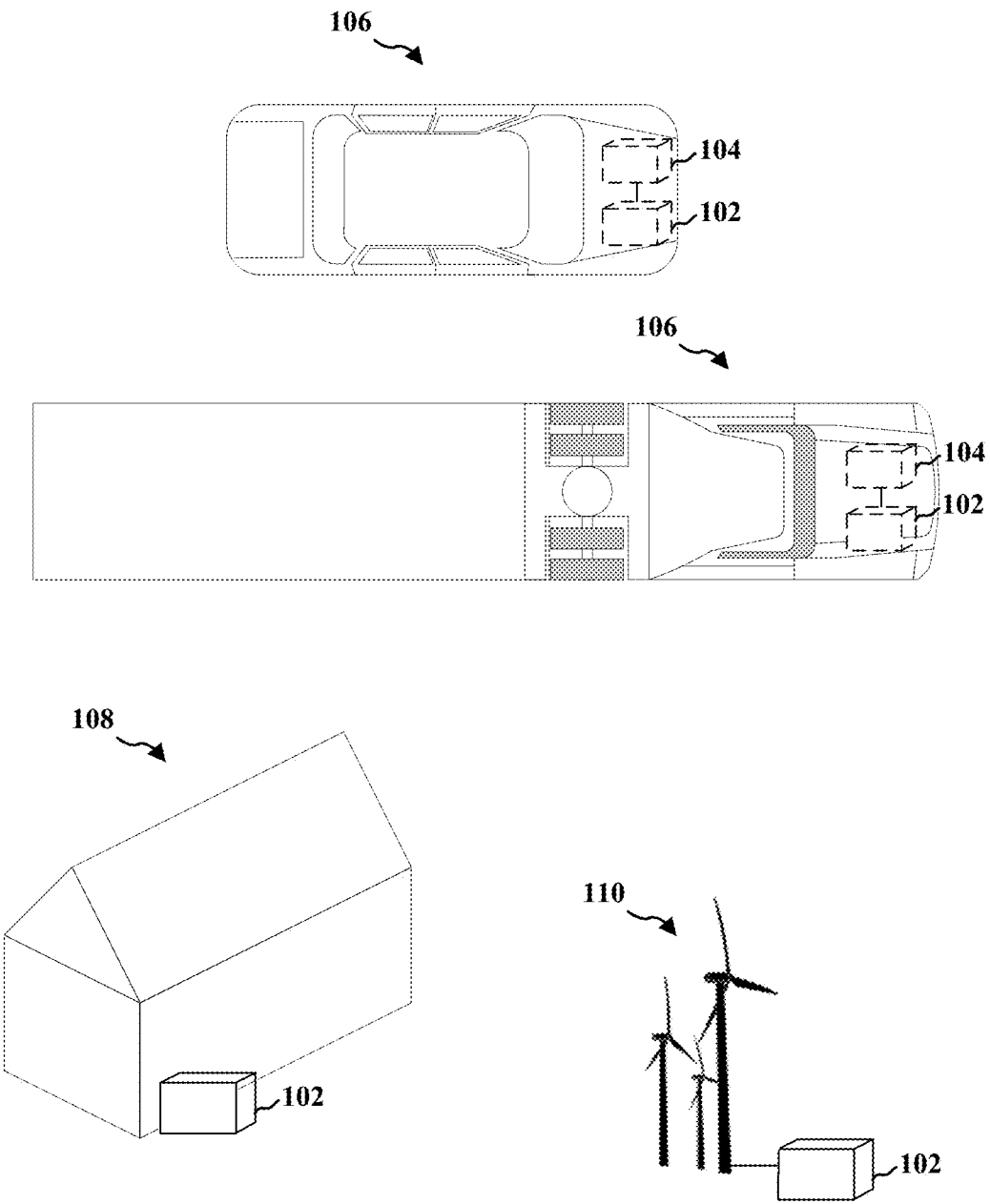
FIG. 1 illustrates example systems including an electric battery pack, in accordance with aspects presented herein.

FIG. 1 illustrates examples of systems that may include an electric battery pack 102 in accordance with the aspects presented herein. The battery pack may be comprised in an energy storage system for commercial and/or residential buildings 108. Energy storage systems may be used to store energy for utilities and/or to supply power to a residential or commercial building(s). Energy storage systems may be a component of a power plant or power generation system, e.g., for utilities. FIG. 1 illustrates a power generation system 110 having battery pack 102 as part of an energy storage system. While wind turbines are illustrated for the power generation system 110, solar and other forms of power generation are equally application.

The battery pack 102 may also be comprised within an electric vehicle and coupled to an electric motor 104 to drive the vehicle 106. As illustrated, the battery pack 102 may be used for different types of vehicles, including vehicles having internal combustion engines, including medium duty vehicles and heavy duty vehicles. The battery pack 102 may be part of a rechargeable battery system for the electric vehicle 106. The battery pack 102 may be coupled to an electric motor 104 that drives the vehicle and may provide a particular voltage/current to the electric vehicle. In one example, the electric vehicle 106 may comprise a fully electric vehicle driven entirely from stored electric power. In another example, the electric vehicle 106 may operate in a hybrid manner using both fuel combustion and stored electric power to operate the vehicle. In yet another example, the electric vehicle 106 may operate in various modes, e.g., a mode in which the vehicle relies on the battery pack for vehicle propulsion without a combustion engine, a hybrid mode in which the battery pack is used in combination with a combustion engine to drive the vehicle, and/or a combustion mode.

As described herein, battery packs and battery modules may be assembled in order to provide different voltages for different applications, e.g., for various vehicle types or for different battery storage applications. Aspects presented herein may be applied to batteries having varying sizes, voltages, and capacities.

FIG. 2A illustrates an example diagram of battery pack 102. The battery pack 102 may comprise multiple battery modules 210, each battery module 210 (also referred to interchangeably herein as a "module") comprising a plurality of modular battery clips 204, as described in connection with FIGS. 3-15. Although three battery modules 210 are illustrated in FIG. 2A, any number of battery modules may be included in the battery pack, e.g., according to the desired voltage, desired capacity, etc. of the battery pack. Similarly, while FIG. 2A illustrate an example battery module 210 comprising seven battery clips 204, each battery module may include any number of battery clips, e.g., according to the desired voltage, desired capacity, etc. of the battery module. Each battery module may comprise a controller board for a Battery Management System (BMS) 212. Each battery module 210 may comprise a slave BMS board (also referred to interchangeably herein as a "slave BMS board"), that may be coupled to a master BMS board 214 for the battery pack 102. The slave BMS board 212 of each battery module 210 may be directly connected to the master BMS board 216, as illustrated by connections 216. The BMS boards, whether master BMS board or slave BMS board may be referred to herein as a "controller board."

The battery pack may include electrical connections, e.g., a positive and negative connection. FIG. 2A illustrates connectors 220 and 230 for the battery pack 102, e.g., for coupling the battery pack with the electric motor 104 of a vehicle 106, with an electrical system of a building 108, and/or power generation system 110. The battery pack may comprise a fuse 222, a current sensor 224, and a contactor 226 coupled via an input bus bar that connects to a first module 210. The order of components 222, 224, 226 may be changed, and additional sensors, such as temperature sensors, may be included in the battery pack. The battery modules 210 may be connected to each other, e.g., in series as illustrated in FIG. 2A or in parallel, as illustrated in FIG. 2B, depending on the desired voltage for the application. Thus, the number of battery modules and the manner in which the modules are connected to each other may vary depending on a desired voltage/capacity for the battery pack. A last battery module 210 may be coupled to contactor 228 and electrical connection 230, e.g., via an output bus bar.

The battery pack may also include a disconnect component 232 positioned between each of the modules 210. For example, a mid-pack disconnect may be provided to selectively break the connection between battery modules 210. Among others, the disconnect component 232 may comprise a switch or a physical component that is removed from the battery pack in order to prevent a complete circuit. The disconnect component 232 provides a safety feature so that the battery pack 102 can be safely serviced. The battery pack may also comprise ducting components, e.g., duct 240, to provide air flow for each of the battery modules 210 in order to provide temperature control for the battery pack. The battery pack may also include a casing in which the components of the battery pack are positioned.

FIG. 2C illustrates example alternate connections between battery modules 210. In FIG. 2A, the modules are connected to each other in series. In the example in FIG. 2A, the voltage of the battery pack 102 will be equal to the sum of the voltage of the individual modules 210. In FIG. 2C, the modules 210 are connected in parallel via connections 234. The voltage of the battery pack 102 in FIG. 2C will be the voltage of a single module, because the modules are connected in parallel. However, the battery pack in FIG. 2C will have an increased capacity due to each of the modules 210. FIG. 2B also illustrates an alternate connection between the master BMS board 214 and the slave BMS boards 212. In FIG. 2A, the master BMS board 214 has a point-to-point connection with each individual slave BMS board 212. In FIG. 2B, a daisy chained connection may be used to couple the master BMS board to at least a subset of the slave BMS boards 212. As illustrated, the master BMS board 214 may have a direct connection to only a single (or a reduced number of) slave BMS boards 212, which may in turn have a connection 218 to at least one other slave BMS board 212.

Figure 3:
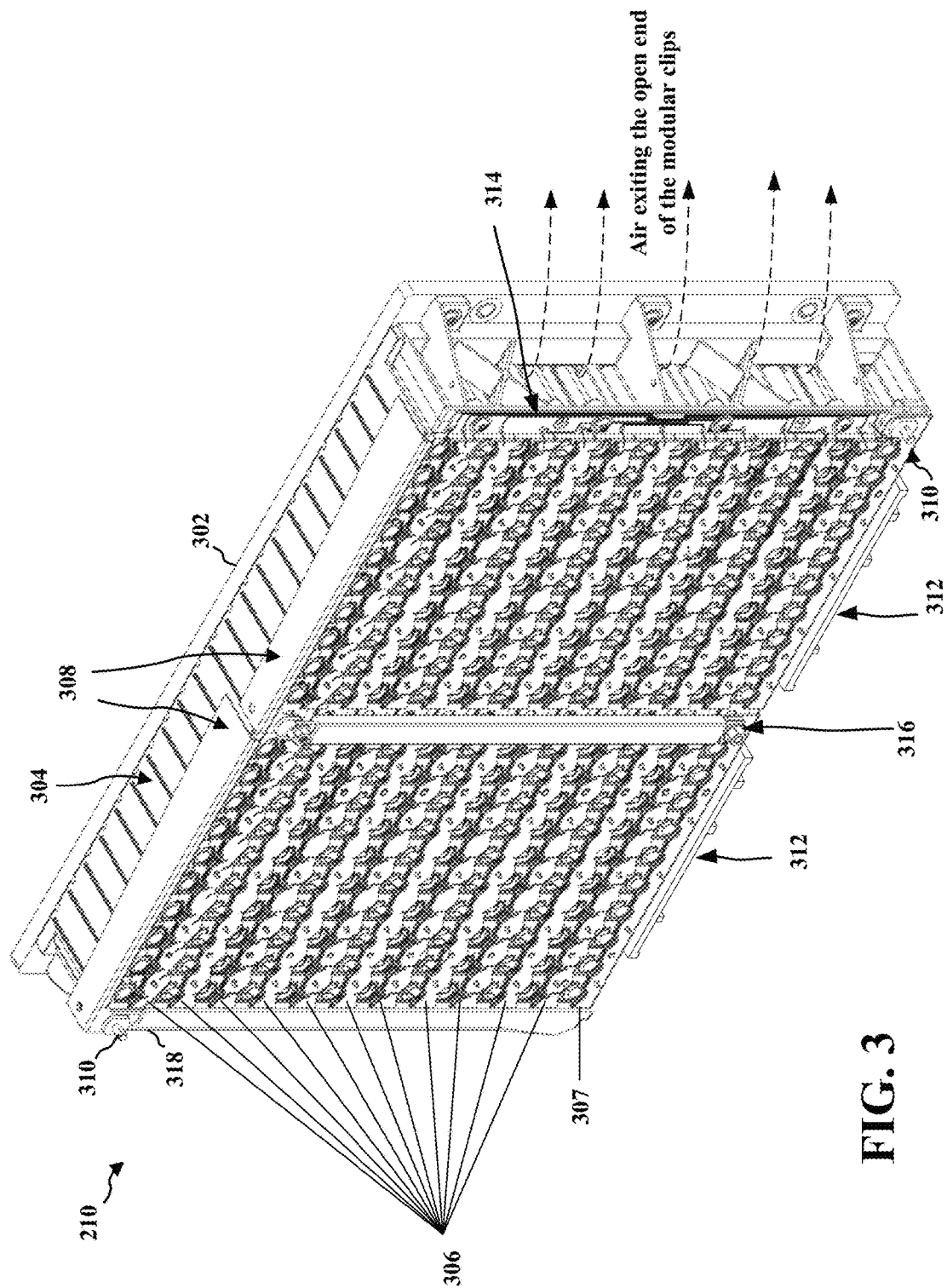
FIG. 3 illustrates an example battery module, in accordance with aspects presented herein.

FIG. 3 illustrates an example of a single battery module 210. The battery pack 102 in FIGS. 1 and 2 may include multiple such battery modules 210, as illustrated in FIG. 2. The battery module 210 comprises a base plate 302 and a plurality of modular clips 104, each modular clip configured to hold a plurality of battery cells. A side wall of a single modular clip 304 at an edge/side of the battery module 210 is visible in FIG. 3.

The base plate 302 may comprise a plastic, e.g., a polycarbonate or other plastic. The base plate may be injection molded using the plastic. However, the base plate may also be made with other materials and/or other methods. For example, the base plate may comprise a metal such as aluminum or steel. The base plate may be machined or die cast rather than injection molded. The modular clip 304 may comprise a plastic, e.g., a polycarbonate or other plastic. The modular clip may be manufactured using injection molding. Depending on the application, the plastic for the base plate and/or modular clips may be selected to include an acceptable flame resistant rating. The plastic may further be selected based on the expected temperature range for a particular application.

A plurality of strips of electric interconnects 306 are provided at a top side of the battery module opposite the base 302. Interconnects 307 and 308 are also provided at the side of the module 210. The interconnects 306, 307, 308 may comprise a conductive material, such as copper. If portions of the base and/or clip are manufactured with a metal, it could be problematic for the base and/or clip to come into contact with interconnects 306, 307, or 308. Thus, a non-conductive coating may be applied to the metal portion of a base and/or clip. The interconnects 306 may have a common configuration, whereas the side interconnects 307, 307 may comprise a different shape than the interconnects 306. Each interconnect 306 may partially overlap two, adjacent modular clips 304. The interconnects 306 may be shaped to allow for connections with battery cells on each side of the interconnect 306. A connection, such as a wire bond may be established between the interconnect and each of the plurality of cells on the two sides of the interconnect. Interconnects 307 and 308 may be provided at a side of the module 210, and may overlap only a single modular clip. Interconnects 307 and 308 may receive connections from cells in only a single modular clip, in contrast to interconnects 306. Connectors 310 provide a connection point for connecting or otherwise coupling the module 210 to other modules, e.g., in series or in parallel, and to the other components of the battery pack 102, as illustrated in FIGS. 2A and 2B.

The module 210 includes at least one PCB 314 and slave BMS board 312 (e.g., corresponding to slave BMS board 212 in FIG. 2). FIG. 2 illustrates an example in which the module may have a single slave BMS board 212. FIG. 3 illustrates an example in which the module may comprise two slave BMS boards 312. The number of BMS slave boards may be based on the capabilities of a particular slave board, e.g., the number of rows of cells in series that the slave BMS can monitor and control. The number of BMS slave boards may also be based on a number of cells connected in series. The slave BMS 212, 312 may be configured to read/monitor a voltage of each bank of battery cells and to balance the voltage. The slave BMS may also be configured to read other sensor readings such as temperature readings at temperature sensors positioned at a subset of battery cells. A BMS master 214 may control the BMS slave boards 212, 312 and control discharging/charging of battery modules 210. In addition to the slave BMS board 312, the module 210 may further comprise at least one Printed Circuit Board (PCB) 314, e.g., a voltage sensing PCB. The PCB 314 may be connected to each interconnect in order to measure voltages between groups of cells. The PCB 314 may also be connected to the slave BMS.

Figure 4:
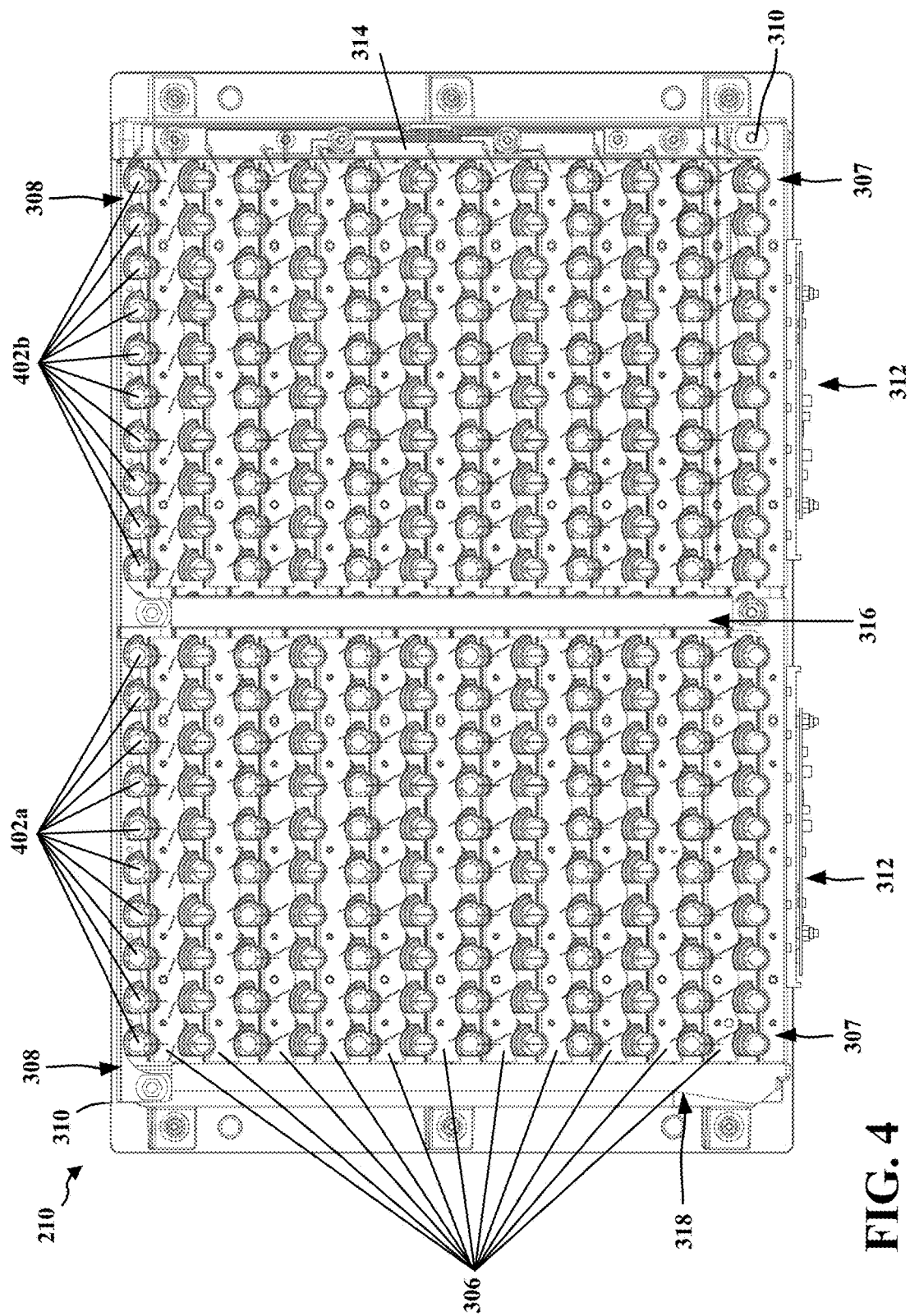
FIG. 4 illustrates a top view of an example battery module, in accordance with aspects presented herein.

FIG. 3 illustrates an example module 210 having 12 rows of modular clips, where each modular clip is able to receive 21 battery cells. In FIG. 3, the module has been configured as two electrical modules on different sides of the bus bar 316. On each half of the module, the 12 rows of modular clips each receive 10 battery cells. Thus, the two electrical groupings of the module 210 form a 12s10p array, with the overall module providing a 24s10p grouping. In another example, the module may not have a bus bar, and the interconnects 306, 307, 308 may extend across a full length of the module rather than half of the length, as illustrated in FIGS. 3 and 4. Such a configuration would lead to groupings of 21 battery cells connected in parallel, and 12 rows connected in series, e.g., a 12s21p grouping. The cells connected in parallel will be charged/discharged together. This configuration would provide half of the voltage of the two electrical modules of FIGS. 3 and 4, and would provide double the capacity.

The number of rows of modular clips and the number of battery cells that a particular modular clip is able to receive in FIG. 3 are merely non-limiting examples. Any number of rows of modular clips may be included in a battery module. For example, a module may comprise between 2-50 modular clips, e.g. between 2-24 modular clips. The design can also be extended beyond 50 modular clips per battery module. The number of modular clips in each module may be determined based on any of a number of factors, e.g., any combination of size limitations, weight limitations, assembly needs, voltage requirements, capacity requirements, etc. For example, a battery pack for energy storage does not have the same size and weight limitations as an electric vehicle and may comprise a higher number of modular clips in a single battery module. Similarly, the number of cells that a modular clip is configured to receive may vary. A modular clip may be configured to receive 2 or more battery cells. A range based on typical size and weight restrictions may comprise between 2-50 battery cells, for example. However, the configuration itself does not place a limit on the number of battery cells or the number of modular clips combined in a single battery module 210. Similar to the basis for the number of modular clips 304 in a module 210, the number of cells 402 within a modular clip 304 may be selected based on any of a number of factors, e.g., any combination of size limitations, weight limitations, assembly needs, voltage requirements, capacity requirements, etc.

FIGS. 3 and 4 illustrate an example in which the module 210 may be configured to include multiple electrical modules, the different electrical modules sharing the same set of modular clips yet being separated by bus bar 316. In this example, the bus bar is positioned across the modular clips at a central position. While the clips physically form unitary rows, the electrical connections formed by the set of interconnects 402a, 402b may form two electrically separate modules. For example, the interconnects 306, 307, 308 extend only to the bus bar 316. Then, a separate set of interconnects are provided on the other side.

The configuration of the module as two separate electrical module enables the module to achieve a voltage double that of a single electrical module, because the configuration doubles the number of groups of battery cells that are coupled in series. Each electrical module may comprise a connection to a separate PCB.

If a higher voltage is desired, additional bus bars beyond bus bar 316 may be provided to further group the cells into electrically separate modules. Thus, a single bus bar 316 at a center cell position of the modular clips, as illustrated in example FIGS. 3 and 4 is merely one example of the use of a bus bar to separate the module 210 into electrically separate modules.

FIG. 4 illustrates a top view of the battery module 210. As illustrated in FIG. 4, ten battery cells 402a, 402b may be positioned in a modular clip on each side of the bus bar 316. A singular modular clip may receive and hold each of battery cells 402a and 402b. However, the cells in the singular modular clip may be grouped into the two electrical groups based on the use of separate interconnects 306, 307, 308 on different sides of the bus bar 316.

Figure 16:
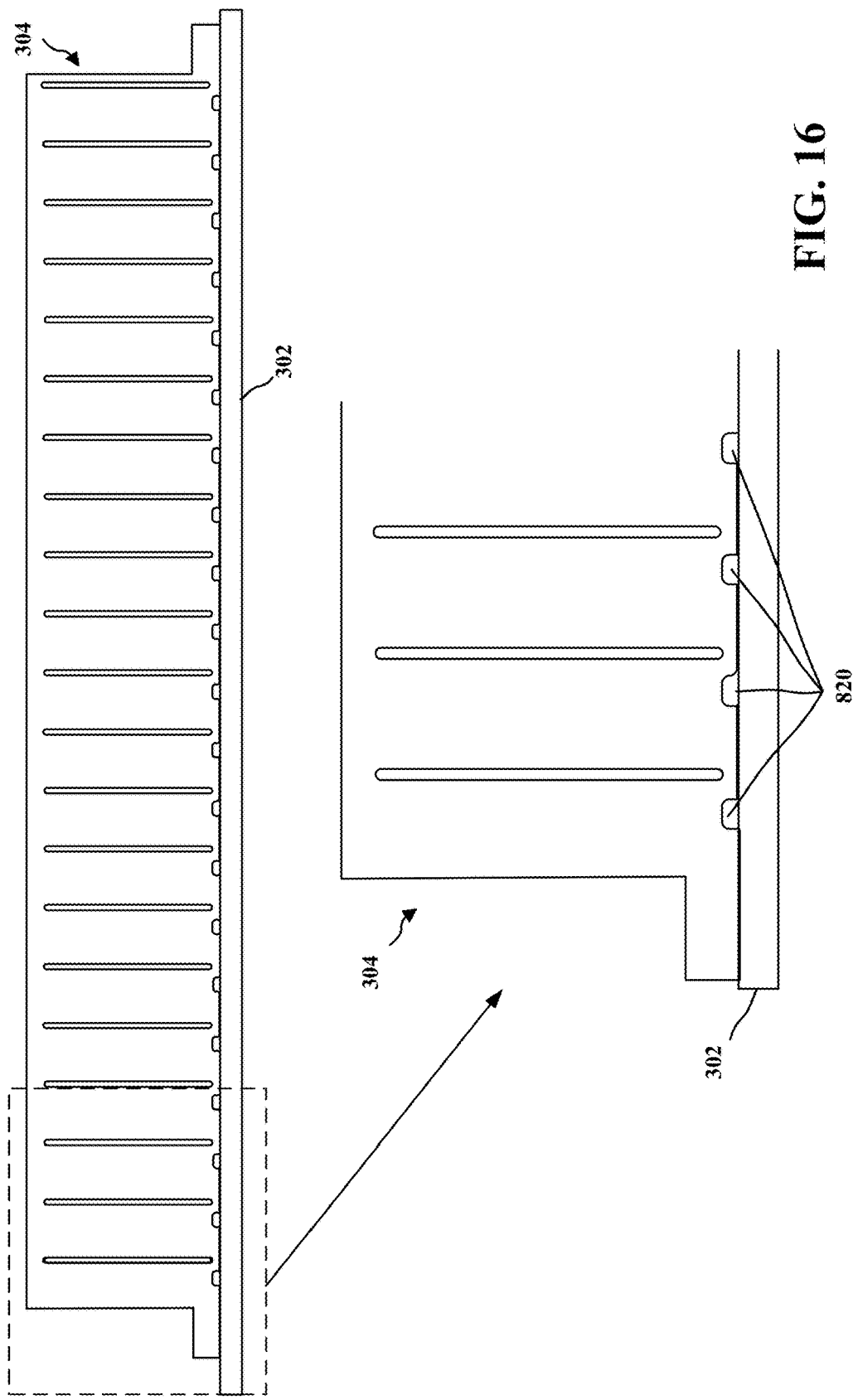
FIG. 16 illustrates a side view of a modular clip and a base plate, in accordance with aspects presented herein.

As described in connection with FIGS. 14-16, a duct 318 may be provided at a side of the module to provide temperature control for the battery cells. Air may be directed from the duct through the modular clips 304. As illustrated with a dashed line in FIG. 3, the air may exit the modular clips at the side opposite the duct 318. The side opposite the duct may be substantially open to allow the air to freely flow through channels formed by the modular clips and out of the battery module 210. A side of the battery module opposite the inlet duct 318 may include an outlet duct, e.g., for the purposes of collecting and directing the outlet air. For example, the outlet air could also be circulated through additional modules. FIG. 2 illustrates an example duct 240 communicating outlet air from one battery module 210 to an inlet duct of another battery module 210.

Figure 5:
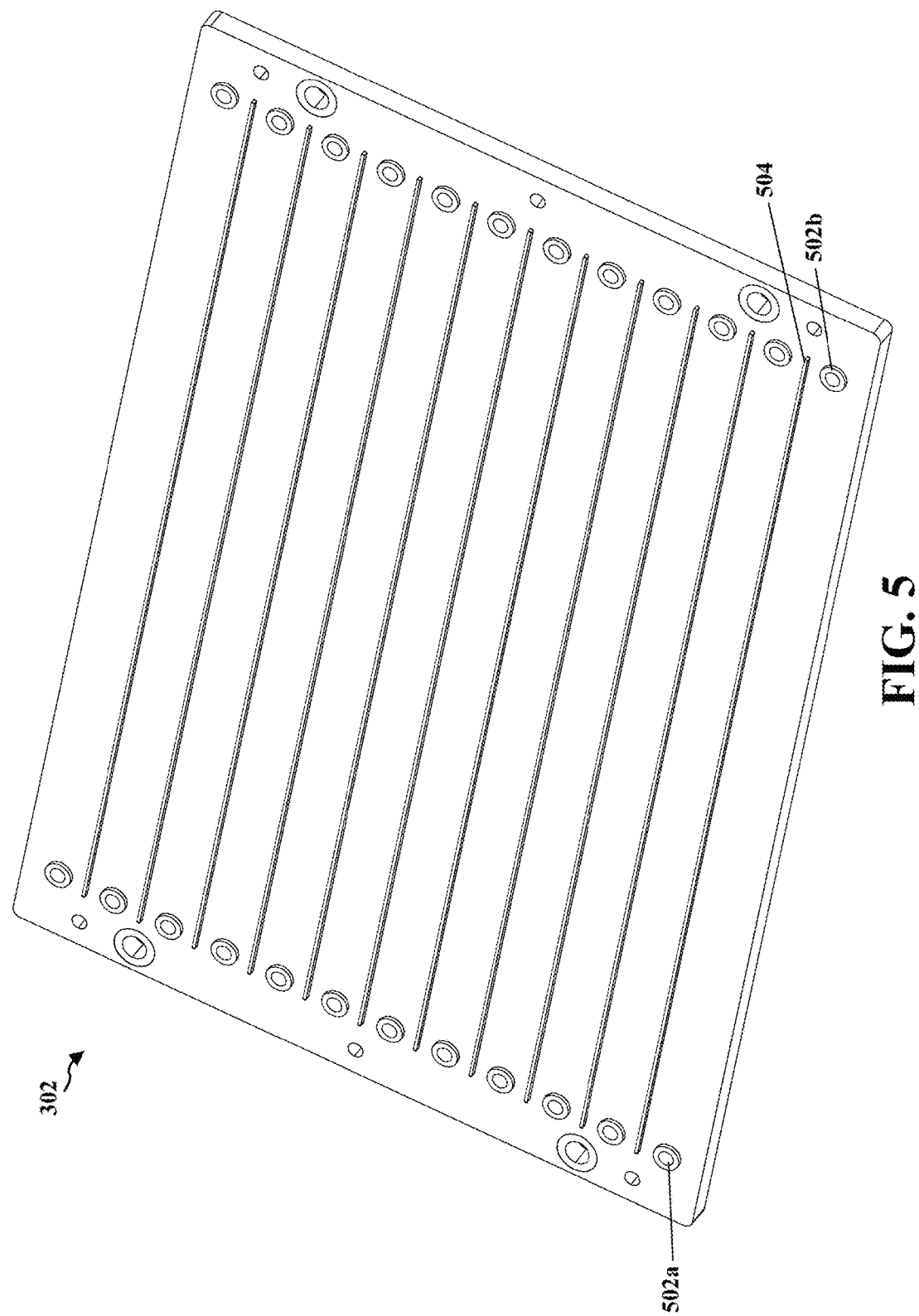
FIG. 5 illustrates a base plate of an example battery module, in accordance with aspects presented herein.

FIG. 5 illustrates an example base plate 302 to which multiple modular clips 210 may be mounted to form a battery module 210. The base plate may include openings to receive at least one fastener to hold each of the module clips to the base plate. For example, opening 502a may receive a fastener at one side of a modular clip, and opening 502b may receive a fastener at the opposite side of the modular clip. The base plate may also include a positioning feature that assists in positioning the modular clips on the base plate. For example, the base plate may comprise at least one raised portion, e.g., a button, for positioning the modular clips. The modular clip may comprise a corresponding indent shaped to match the raised portion. The raised portion and matching indent assist the modular clips in being positioned with the correct spacing. FIG. 5 illustrates an example in which the raised portions may surround the openings 502a, 502b that receive the fastener to couple the modular clips 304 to the base plate 302. The base plate may also comprise a raised portion 504 that runs parallel to the modular clip.

Figure 6:
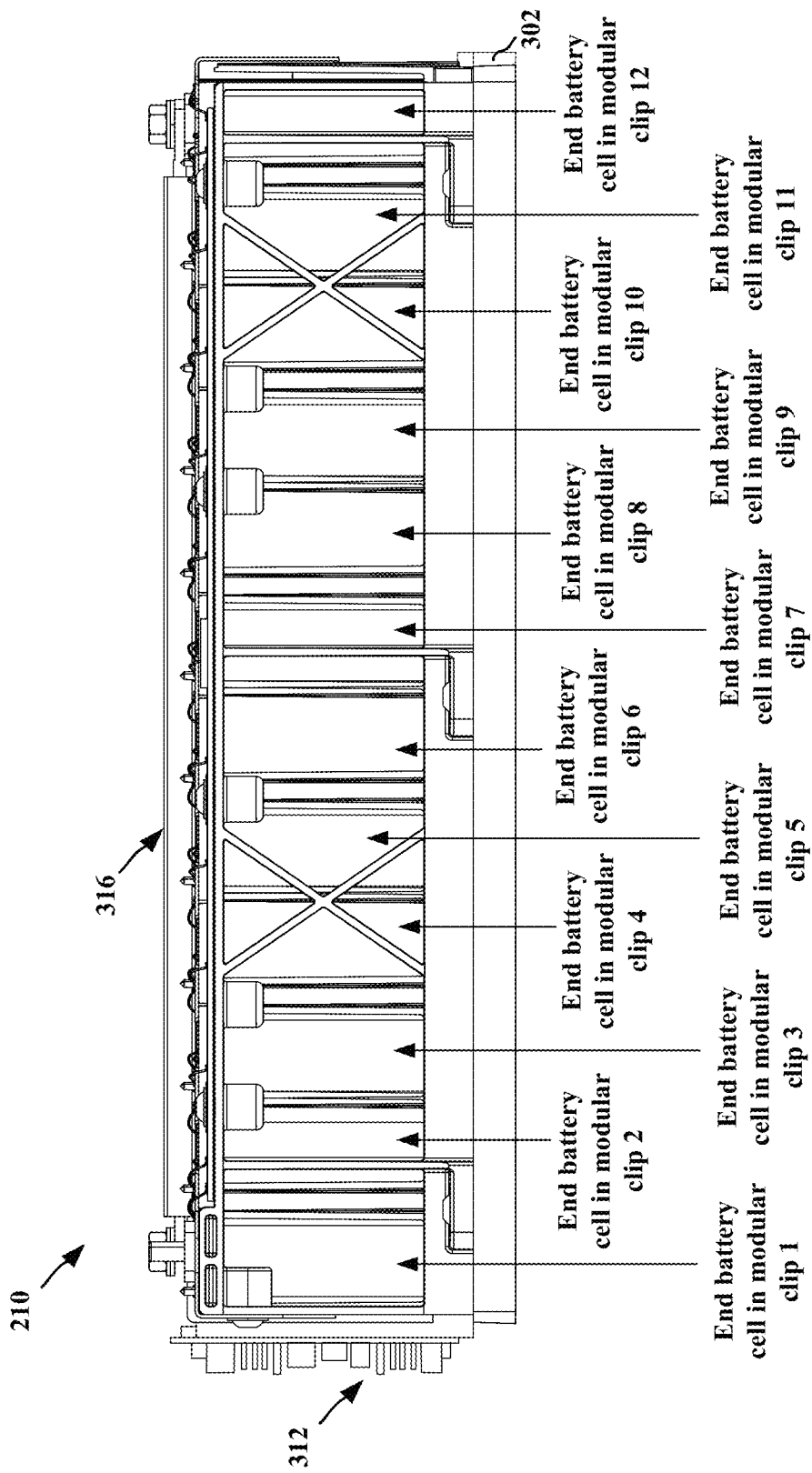
FIG. 6 illustrates a side view of an example battery module, in accordance with aspects presented herein.

FIG. 6 illustrates a side of battery module 210 opposite the duct 318. This open side of the battery module 210 is the side through which the air exits the cooling paths formed by the modular clips. The side of the module 210 visible in FIG. 6 is substantially open to allow air flow to freely exit from the path or channel formed by each modular clip. A single battery cell 402 in each of the 12 rows of modular clips is visible in FIG. 6.

Figure 7:
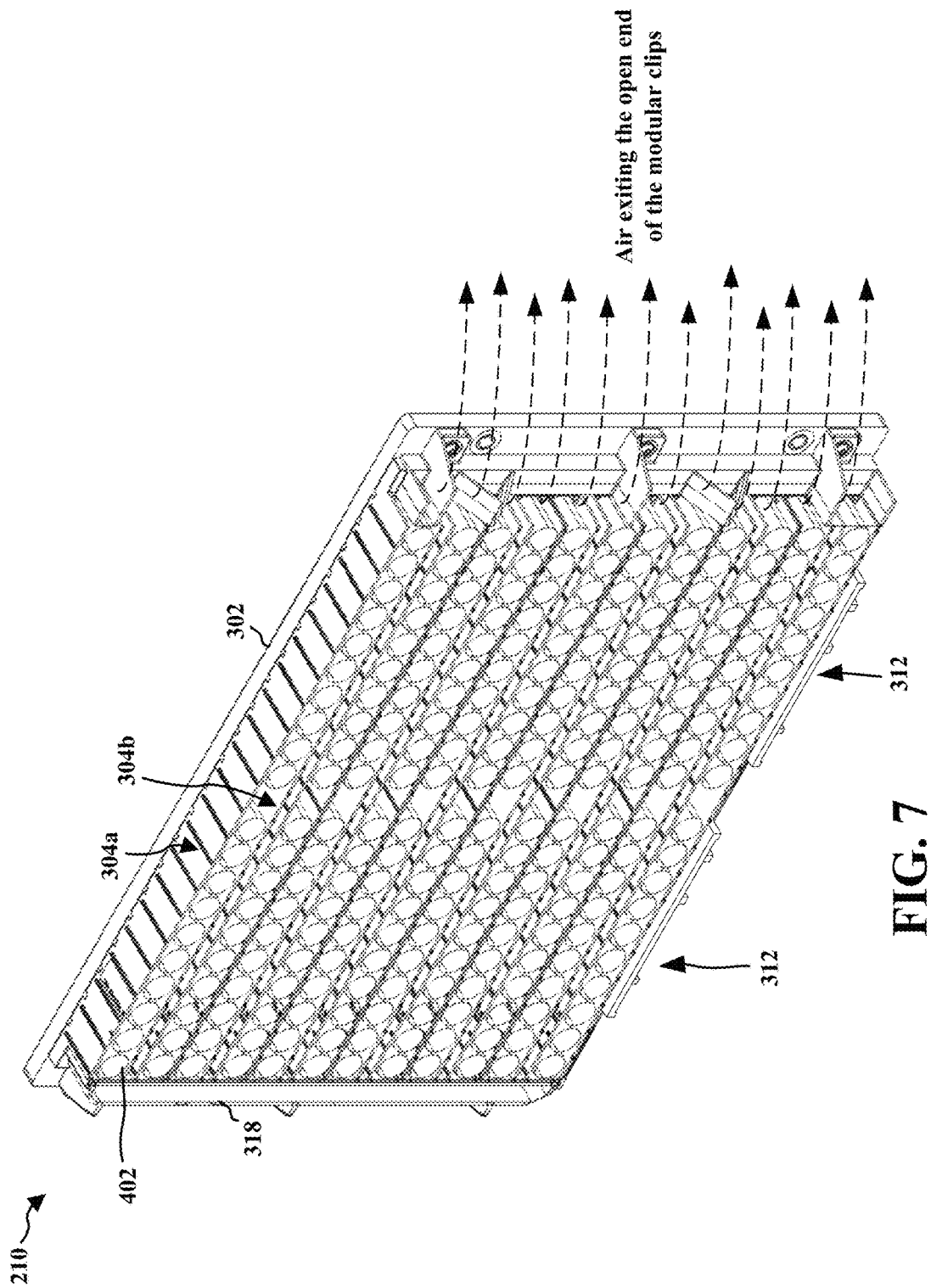
FIG. 7 illustrates a view of an example battery module having interconnects and retainer plates removed, in accordance with aspects presented herein.
Figure 8:
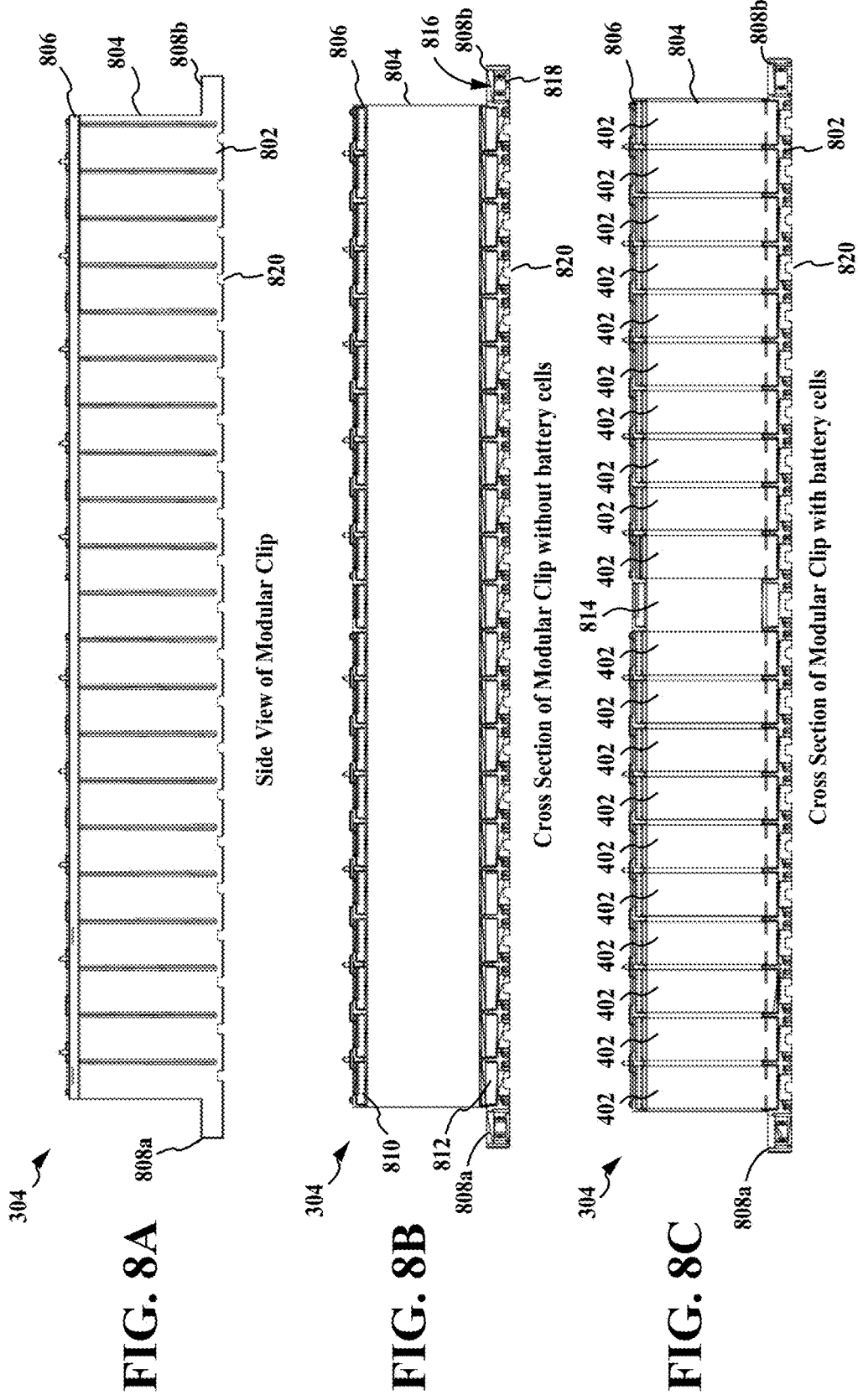
FIGS. 8A, 8B, and 8C illustrate a side view, and cross sections of a side of a modular clip, in accordance with aspects presented herein.

FIG. 7 illustrates a view of the module 210 similar to FIG. 3, however, having interconnects 306, 307, 308 and retainer plate 806 removed so that the linear rows of cells 402 in each modular clip are visible. The modular clips each comprise two walls 304a and 304b that extend the length of the modular clip. The battery cells 402 are received into the modular clip and positioned between the two walls, e.g., in a linear row. In FIG. 7, the central cell position in each modular clip is empty and does not include a battery cell. The bus bar may be positioned at this central location, for example.

FIG. 8A illustrates a side view of a single modular clip 304. FIGS. 8A, 8B, 8C, 9 and 10 illustrate an example of a modular clip 304 for assembly in a battery module 210. The modular clip 304 includes a housing 801 configured to receive a plurality of battery cells 402. FIG. 8B illustrates a cross section of the modular clip prior to insertion of battery cells 402, and FIG. 8C illustrates a cross section of the modular clip having battery cells 402 inserted into the housing. FIG. 8C illustrates a position 814 at which no battery cell has been inserted. This may be the position of the bus bar 316, for example.

The housing of the modular clip 304 may include a base portion 802. The base portion 802 may comprise a plurality of bottom cell recesses 812 configured to surround a portion of each of the battery cells 402. FIGS. 8B and 8C illustrate the bottom cell recess 812 formed as an indent in the base portion 802 and having a shape corresponding to the exterior of the battery cell 402. In FIGS. 8B and 8C, the bottom cell recess 812 comprises a circular/cylindrical indent. However, for battery cells of different shapes, e.g., prismatic, hexagonal, triangular, square, etc., the indent may be similarly formed with a corresponding shape to receive the battery cell.

The housing of the modular clip 304 includes a first wall 804a and second wall 804b extending from the base portion 802. FIG. 8A illustrates a side view of one wall 804. The plurality of battery cells 402 are received in the housing between the first wall 804a and the second wall 804b.

The modular clip 304 may also comprise a top portion 806, referred to interchangeably herein as a "top retainer plate." The base portion 802 and walls 804a, 804b may be formed as a unitary piece, and the top retainer plate 806 may be configured as a separate piece of the modular clip 304 that is attached after the cells 402 are inserted into the modular clip. In other examples, the base portion 802 and the walls 804a, 804b may comprise separate components that are coupled together along with the top retainer plate to form the modular clip. The top retainer plate 806 may comprise upper/top cell recesses 810, shaped to surround a portion of the exterior of the battery cell. The plurality of top cell recesses 810 may be aligned corresponding to an alignment of the plurality of bottom cell recesses 812 in the base portion, which may also be referred to as a "bottom cell retainer." Thus, a pair of a top cell recess 810 and a bottom cell recess 812 may jointly surround portions of a battery cell at each end of the cell, e.g., at the top and bottom of the battery cell. The cell recesses provide mechanical support to the battery cells in the event of a shock to the battery pack and controls the spacing between cells in the modular clip. Thus, within a modular clip, the battery cells may be positioned at a set spacing from adjacent battery cells. Cell spacing may be selected to meet passive propagation resistant (PPR) needs for the particular cell and wall spacing of the modular clip. The spacing may be determined empirically based on the configuration of the modular clip, the particular battery cells, the chemistry of the battery cells, the specification of the battery cells, the charge capacity of each battery cell, etc. In one example, the gap between battery cells within the row of a single modular clip may be greater than approximately 2 mm. The top and bottom cell retainers may enable the battery cells to be slip fit into the modular clip. The bottom cell recesses may have a depth in the range of approximately 3 mm to approximately 20 mm, or a depth of up to ⅓ the height of a battery cell. The top retainer plate 806 may comprise an opening corresponding to each of the plurality of cells. The opening may be configured to enable a connection to be made to the upper portion of the cell and the interconnects 306, 307, or 308.

Figure 18B:
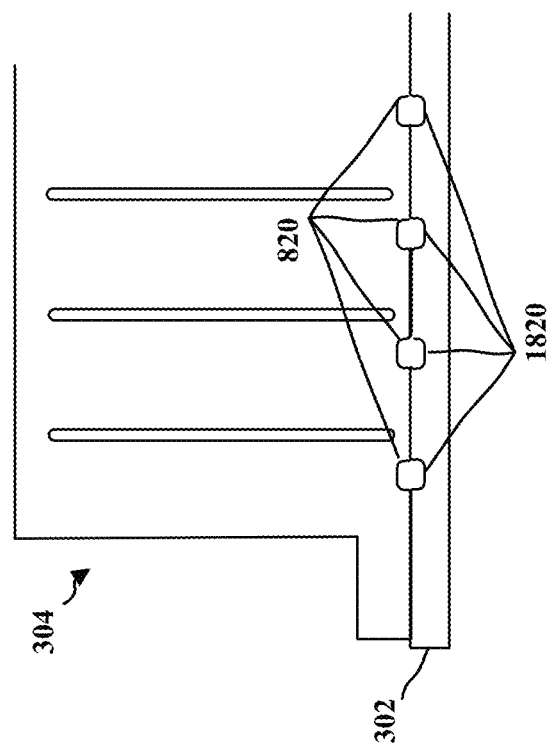
FIG. 18A and FIG. 18B illustrate examples of venting channels, in accordance with aspects presented herein.
Figure 18A:
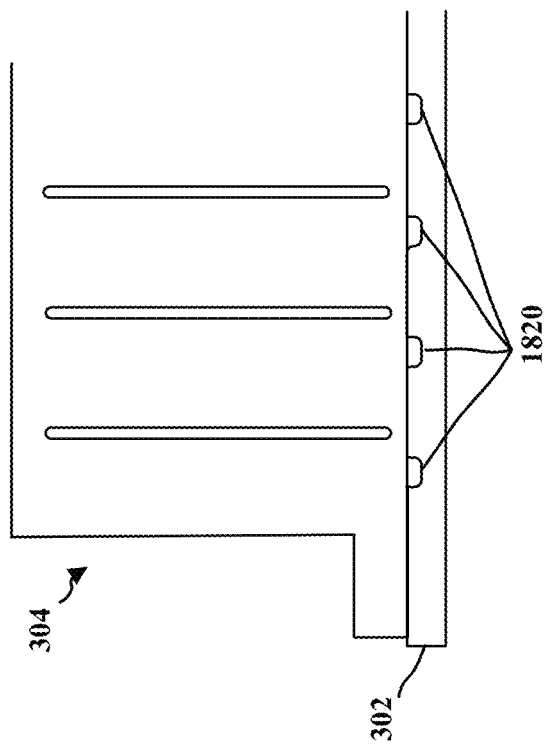

FIGS. 8A, 8B and 8C also illustrate extending portions 808a, 808b that may extend from each side of the modular clip 304. The extension portions 808a, 808b may comprise openings 816 configured to align with the openings 502a, 502b in the base plate. A fastener may be inserted through the openings 808a, 808b, 502a, 502b and fastened in order to couple the modular clip 304 to the base plate 302. Openings 808a, 808b may each comprise a compression limiter 818 that is configured to prevent the extending portion 808a, 808b from being crushed when the modular clip is fastened to the base plate 302. The compression limiter may comprise a different material than the modular clip. For example, the modular clip may comprise a plastic, and the limiter may comprise a metal. For example, the compression limiter may comprise a metal ring positioned inside the opening 808a, 808b. The fastener may comprise a threaded fastener, such as a screw. The modular clips may also be fastened to the base plate using other fastening mechanisms, e.g., including a tab attachment piece at the modular clip, an adhesive, a heat pin, etc. FIGS. 8A-C also illustrate a plurality of channels 820 configured in the base portion 802. Alternately, the channels may be formed in a base plate, as illustrated in FIGS. 18A and 18B. In either alternative, an opening surrounding a vent of a battery cell may operate in connection with the channels to vent heat/gas from rupturing battery cells away from the interior of a modular clip in which the battery cells are held. Thus, the openings and channels may improve the PPR of the battery.

The bottom cell recesses 812 may each comprise an opening around a bottom vent of the battery cell 402. The channels 820 may communicate with the opening to enable the battery cell to vent to the exterior of the battery module when a rupture occurs. FIG. 12A illustrates a cross section of the opening 1202 and channel 820.

Figure 9:
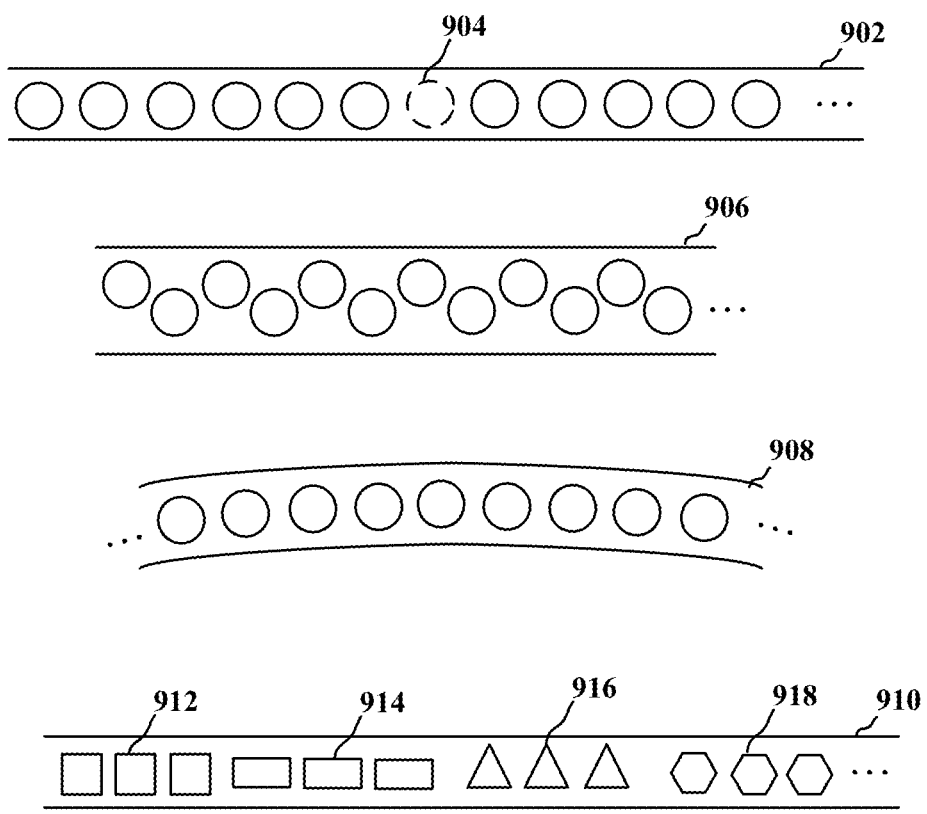
FIG. 9 illustrates example modular clips, in accordance with aspects presented herein.

Various types of battery cells 402 may be used in connection with the aspects presented herein. The battery cell may comprise a lithium-ion battery cell. Other examples of the chemistry of the battery cell may comprise nickel-metal hydride, lead-acid, lithium iron-phosphate, lithium titanate, etc. While cylindrical battery cells are illustrated in FIG. 7, the battery cells may comprise a prismatic cell, cylindrical cell, or other geometries. FIG. 9 illustrates a modular clip 910 having different examples of prismatic batteries, e.g., having a square cross-section 912, a rectangular cross-section 914, a triangular cross section 916, and a hexagonal cross-section 918. The cell recesses in the modular clips may be shaped according to the exterior shape of selected battery cell. Similarly, the aspects presented herein may be configured for use with battery cells of various sizes. One example of a cylindrical battery cell may be a 10 mm diameter and a 70 mm length. Other shapes/sizes of battery cells are equally applicable to use in the modular clip design presented herein. For example, another size battery cell may comprise an 18 mm diameter and 65.6 mm length, etc. The modular clip may be scaled to the size of any particular battery cell. For example, the top and bottom recesses of the modular clip may be sized and shaped to receive any size/shape of a particular battery cell.

The modular clips in FIGS. 3-8C are illustrated as having linear walls 804a, 804b to form straight rows of battery cells. The modular clips are also illustrated as only having a single row of battery cells. FIG. 9 illustrates an example modular clip 902 configuration having a single linear row of cells of any number. At least one cell position 904 may be left unoccupied. This may be for a bus bar position to create different electrical units for the cells within a modular clip or for other uses. Modular clip 906 illustrates an example modular clip being configured to receive two staggered rows of battery cells. Additionally, the modular clips may be nonlinear. For example, the walls of the modular clip may have a curved, rounded, arced, or other customized shape. Modular clip 908 illustrates an example modular clip having curved walls. Thus, the modular clip, battery modules, and battery pack described herein may be shaped to fit to a customized position in a vehicle or other structure.

Air flow for temperature control may be directed, at least in part, by the shape of a modular clip 304. Each modular clip 304 may include a cooling path, e.g., a gap, channel, or opening, that extends along the length of the modular clip past each of the cell holders that receive battery cells. While the path is referred to herein as a "cooling path," the path comprises a path for temperature regulation/control whether cooling battery cells to avoid overheating or warming battery cells in a cold environment to maintain an optimal operating temperature. There is no limitation that the path be used to cool rather than warm or otherwise maintain an optimal temperature of a battery module. The cooling path may comprise a gap 1102 or channel between a wall of the clip and the battery cells. Thus, when battery cells 402 are inserted into the cell holders 812, the cooling path 1102, 1102a, 1102b directs air to flow through the length of the clip 304, flowing past and around the battery cells 402. This air flow through the clips 304 controls the temperature of the battery cells 402 without requiring additional components such as a cold plate.

Figure 10:
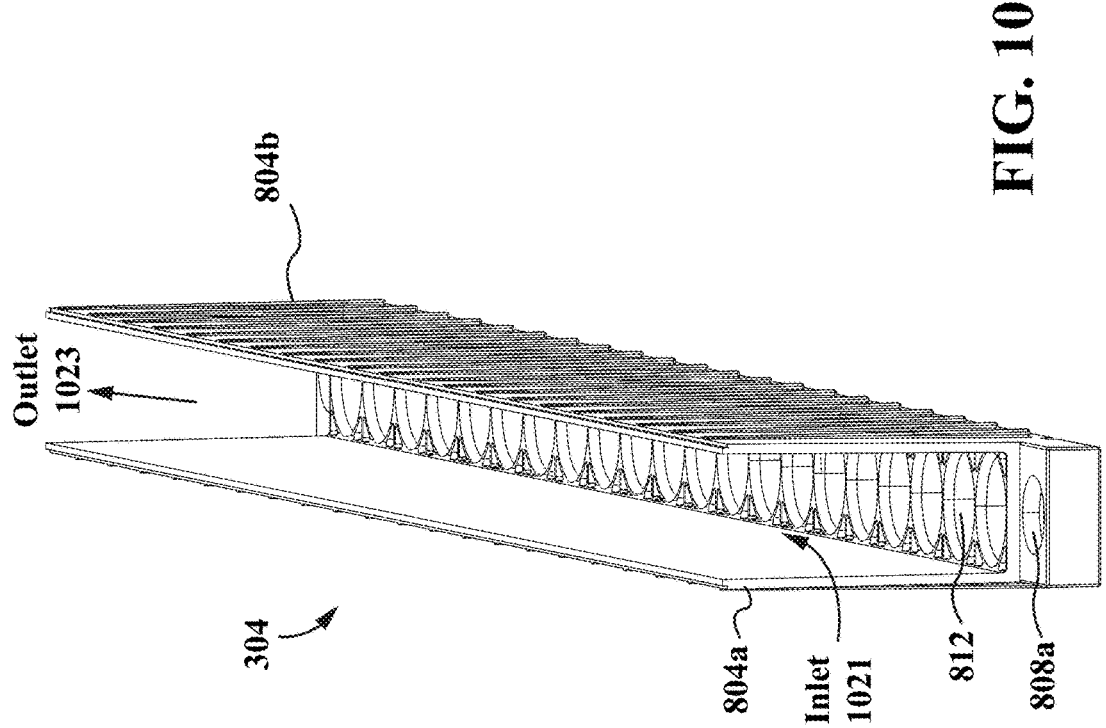
FIG. 10 illustrates a perspective view of an example modular clip shell, in accordance with aspects presented herein.

As illustrated in FIG. 10, a first end 1021 of the modular clip forms an inlet for air flow into the cooling path 902a, 902b and a second end 1023 of the modular clip, opposite the first end, forms an outlet for air flow exiting from the cooling path. Thus, the cooling path allows air to flow into one end of a channel formed by the modular clip and out the opposite end of the channel formed by the modular clip. The air flowing through the cooling path cools the battery cells and enables the battery cells to maintain the necessary temperature while the battery is in use.

Figure 11:
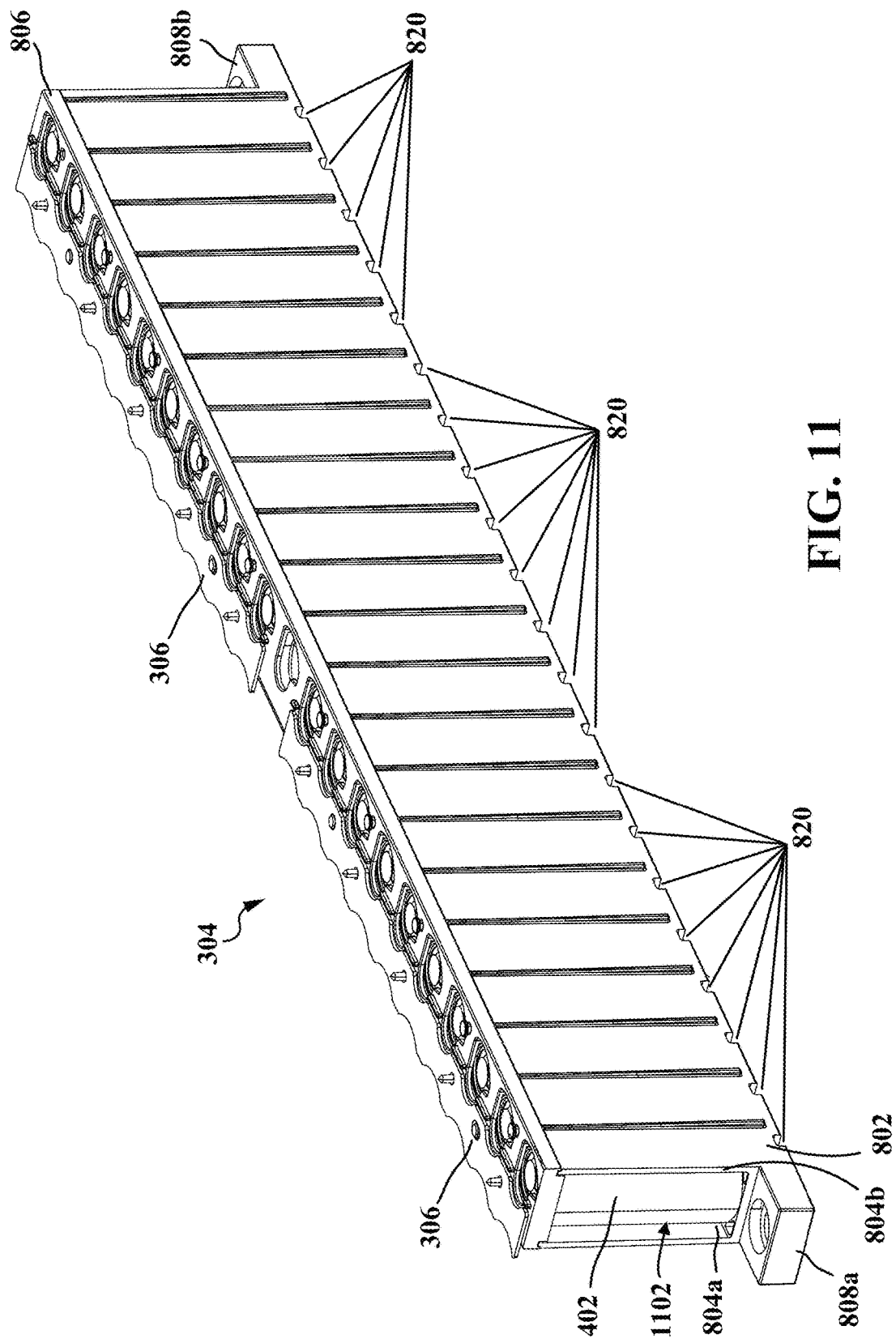
FIG. 11 illustrates a perspective view of an example assembled modular clip, in accordance with aspects presented herein.

Thus, the modular clip shell may described as having two portions. A first portion includes the base portion 802 that fits around the battery cell and helps to secure the battery cell in its position within the modular clip. The second portion is formed by the walls of the housing that are spaced from the exterior of the battery cells. The modular clip may be formed to receive the plurality of cells in a row. FIG. 10 illustrates a perspective view of a bottom portion of a modular clip, e.g., including base portion 802 and walls 804a, 804b. This portion of the modular clip may also be referred to as the clip "shell." FIG. 10 illustrates that the base portion and walls form a channel through which air may be directed to cool or otherwise regulate the temperature of the battery cells received into the cell retainers 812 of the clip 304. FIG. 11 illustrates a perspective view of a modular clip 304 comprising the top retainer plate 806, battery cells 402, and an electrical interconnect 306. FIG. 11 illustrates a gap 1102 formed between a cell 402 and wall 804a of the modular clip 304.

FIG. 12A illustrates a cross section of a modular clip 304 holding a battery cell 402. Gaps 1102a, 1102b are formed between the battery cell 402 and the walls 804a, 804b of the modular clip. FIG. 12B illustrates an end view of the modular clip 304 and shows that the gaps 1102a, 1102b extend the length of the modular clip.

In addition to the clip shell, the modular clips 304 may also comprise a retainer plate 806. Thus, the cooling path formed in each of the modular clips may be formed along the length of the housing of the clip from the inlet to the outlet in the gap that extends between the base portion 802 and the retainer plate 806 of the modular clip. The air flow channels of the modular clips assists the air to flow evenly past each of the battery cells in the channel. Thus, each cell receives an even amount of air exposure.

Figure 13:
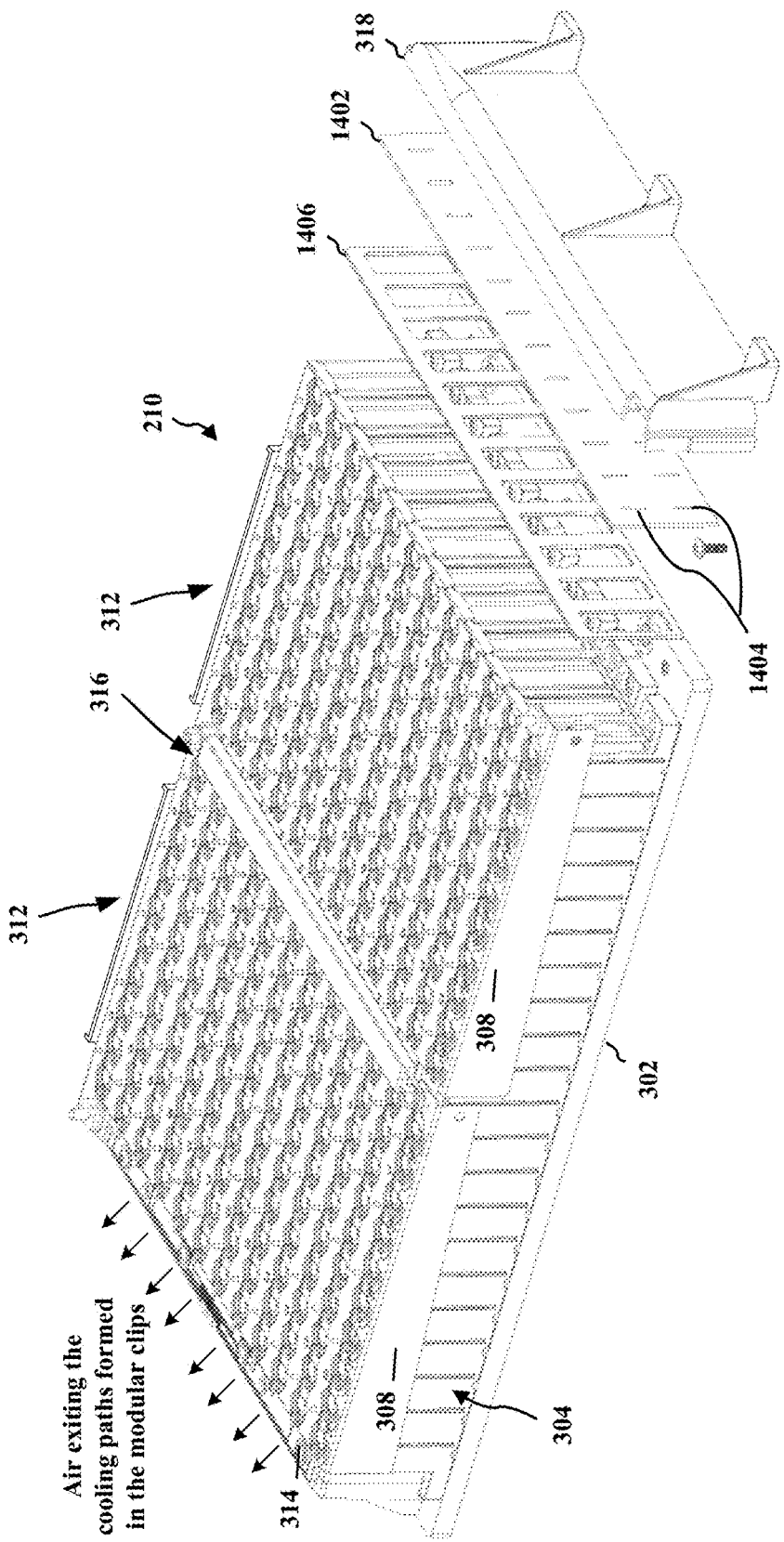
FIG. 13 illustrates an exploded view of an example battery module, in accordance with aspects presented herein.

The module 210 may further comprise a regulator 1402 configured to regulate/control the air flow into each of the inlet ends of the modular air clips, as illustrated in the exploded view of FIG. 13. The regulator 1402 may comprise a plate that extends along a side of the module such that the regulator extends across an end (e.g., which may be referred to as an inlet end) of each of the modular clips.

FIG. 13 illustrates an example view of a battery module from a side having a duct 318. Air flow may be driven into the duct with a fan. As illustrated in FIG. 13, the regulator plate 1402 may include multiple openings 1404, at least one opening corresponding to each inlet end of each of the modular clips 304. The size and shape of the openings 1404 in the regulator plate 1402 may be configured to control air flow to the cooling path of each of the modular clips.

Vent

The present application describes a modular configuration that provides increased manufacturing efficiency, improved electrical connections, increased ease for repair and service. The configuration also provides added safety and PPR of a battery module and battery pack comprising multiple battery modules.

At times, defective or damaged battery cells may fail. Damage may occur for various reasons, e.g., debris, vehicle accidents, storms at power generation/storage locations, etc. The temperature of the battery cell may rise until the exterior of the battery cell ruptures. A rupturing battery cell may release flame and hot gas at a very high temperature. The effect of one battery cell rupturing may cause serious damage to other battery cells and may lead to similar thermal runaway and rupture in surrounding battery cells. This chain reaction can quickly engulf an entire battery pack. An important safety feature for such battery packs is to improve the Passive Propagation Resistance (PPR).

Aspects presented herein provide a modular clip for an electric battery that not only provides for increased manufacturing efficiency, improved electrical connections, easier repair and service, but also provides improved PPR. A battery module comprising multiple such modular battery clips and a battery pack comprising multiple battery modules are also described herein.

A modular clip 304 may further include a plurality of openings 1202, in addition to the walls and base portion having recesses to receive a plurality of battery cells. Each opening may be configured to extend around a bottom vent of a battery cell that the modular clip is configured to receive. FIG. 12A illustrates a cross section of a modular clip 304 and a cross section of a battery cell 402 positioned within the modular clip. Dashed lines at 1250 illustrate the location of the battery cell's bottom vent 1251. When a battery cell comprises a cylindrical battery cell having a circular bottom vent 1251 of a first diameter, the opening 1202 in the base 802 may comprise a second diameter that is larger than the first diameter of the circular bottom vent, as illustrated in FIG. 12A and in FIG. 15B.

The design is not limited to a cylindrical battery cell. The battery cell may have a different exterior shape, as illustrated in FIG. 9. A bottom vent may have a non-circular shaped, as well. The shape/size of the opening 1202 in the base of the modular clip may vary, as long as it extends to fully surround a bottom vent of the battery cell.

The modular clip may also include at least one channel 820 formed in the base portion. Each of the plurality of openings may have at least one channel extending from the corresponding opening to an edge of the modular clip. As illustrated, opening 1202 extends wider than the perimeter of the battery cell's bottom vent 1251. Channel 820 communicates opening 1202 to the exterior of the modular clip. The channels may be configured to enable heat and/or gas escaping from the bottom vent of the battery cell positioned in cell recess 812 to vent away from an interior of the modular clip. The interior of the modular clip may comprise the area between the walls 804a, 804b and between the base 802 and retainer plate 806. The heat/gas may be vented out toward an exterior side of the modular clip 304 while the battery cell is protected within the clip housing.

As illustrated in FIG. 13, the modular clips 304 may each extend in a linear direction. The plurality of channels may extend in a direction perpendicular to the linear direction, in a direction parallel to the liner direction, etc., in order to direct escaping heat/gas to the side of the assembled group of modular clips.

FIGS. 14A and 14B illustrate a top view of an empty modular clip and a bottom view of an empty modular clip, respectively. FIG. 14B illustrates channels 820 that extend in a direction perpendicular to the row of battery cells of the modular clip 304 and also shows channels 821 that extend in a direction parallel to the rows of battery cells. Thus, the channels 820, 821 may enable escaping gas/heat to vent in multiple directions to different edge of the battery module 210.

As illustrated in the cross sections of FIGS. 8B, 8C, and 12A, the base portion of the modular clip 304 may comprise a plurality of cell recesses 812. Each cell recess may be configured to receive and surround a portion of the battery cell that the modular clip is configured to receive. The vent opening 1202 in the base portion may be aligned with the plurality of cell recesses, as illustrated in FIGS. 14A, 15A. FIG. 15A also illustrates that a rim 1525 may be formed in each of the plurality of cell recesses. Each rim 1525 may surround one of the plurality of openings 1202. FIG. 15A illustrates a close up top view of a portion of two modular clips, e.g., FIG. 15A only illustrates a portion of the two modular clips that receives three battery cells. The rim 1525 may provide support for the battery cell. An adhesive may be applied around a bottom perimeter of the battery cell prior to placement in the modular clip. The adhesive may bond the battery cell to the rim portion of the modular clip.

The plurality of channels 820 may be configured to align with the same channels of a second, matching modular clip when the two modular clips are positioned beside each other, e.g., when mounted to a base plate. FIG. 15B illustrates a close up bottom view of a portion of the two modular clips from FIG. 15A. FIG. 15B illustrates that when the two modular clips 304 are positioned beside each other, the channels 820 align. Therefore, even a battery cell in a middle modular clip of a battery module can use the channel 820 to vent gas/heat toward the side of the battery module. The arrows in FIGS. 15A and 15B illustrate the direction in which gas/heat would be vented out through the channel 820 and 821. The base plate may include a positioning mechanism for positioning the plurality of modular clips against the base plate for alignment of the plurality of channels of different modular clips. For example, the base plate may include a raised portion that matches an indented portion on a modular clip. This positioning mechanism may ensure that the venting channels of the modular clips are properly aligned.

The modular clip 304 may be configured to be positioned against a base plate 302. FIG. 16 illustrates the channels 820 when the modular clip is coupled to the base plate 302. The channel extends between the base plate 302 and the clip 304. The base portion of the modular clip may also be configured to space the rim holding the battery cell from the base plate to form a cavity between the base plate and the bottom of the modular clip. The channel 820 crosses the cavity. Channel may similarly cross the cavity in an opposite direction. The cross-section of FIG. 12A illustrates the cavity as does the cut away view of FIG. 17.

In one example, a width of the channel may be within a range of, e.g., 1 mm up to the width of the opening 1202. When the opening 1202 is circular, the width of the opening 1202 may be the diameter of the circular opening. The size of the opening 1202 may be selected based on the size of a vent for a particular battery cell. Different models and manufacturers of battery cells may have different vent sizes and shapes.

In an example, the height of the channel 820, 821 may be within a range of 1 mm up to the height of the lower cell retainer. The height of the channel may be selected so that the channel 820, 821 is separated from the air cooling path 1102a, 1102b. The channel 820, 821 enables flame and gas to be vented away from the other battery cells within the modular clip. If the channel opened into the cooling path 1102a, 1102b it may allow the flame/hot gas to travel down the cooling path to those other cells. In an example, the height of the channel may be less than 50% of the height of the lower cell retainer. For example, this height configuration may prevent a reduction in the strength of the lower cell retainer and the overall modular clip.

Figure 17:
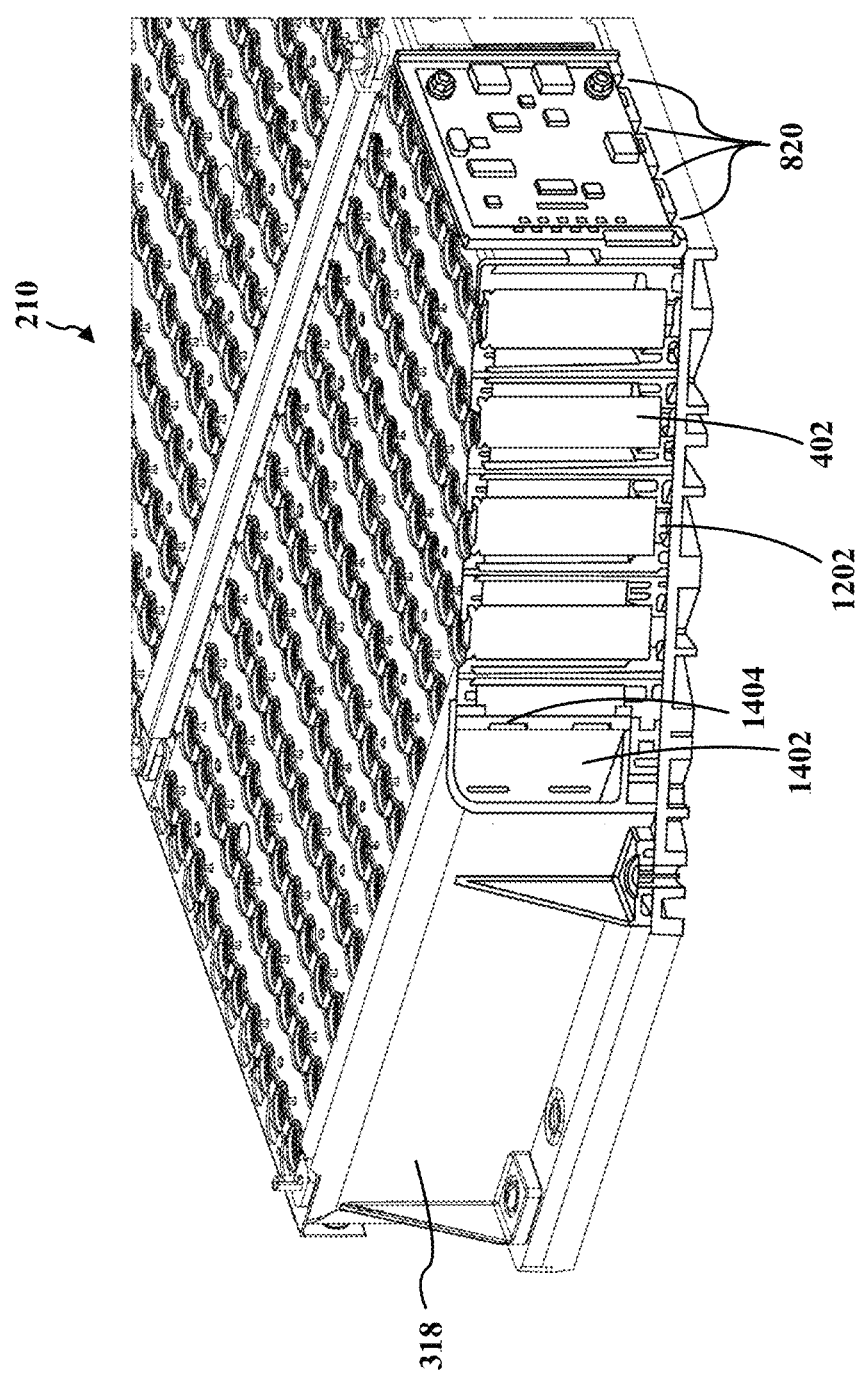
FIG. 17 illustrates a cut away view of an example battery module, in accordance with aspects presented herein.

FIG. 17 illustrates a cut-away view showing the interior of the duct 318, in which the vent opening and vent channel of the modular clips are illustrated. The opening of the channels 820 at the side of the battery module are visible below the slave VMS board. The cut away illustrates the open area between the bottom of the modular clips 402 and the top of the base plate 302. The vent channels 820, 821 may be formed in this open area.

Figure 19:
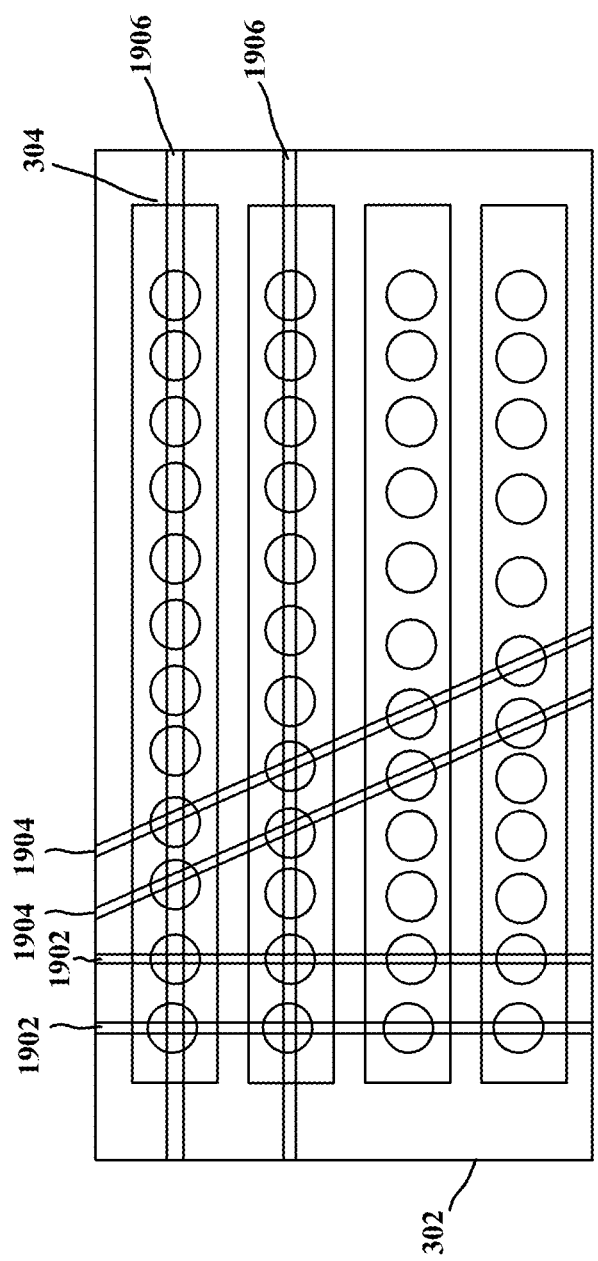
FIG. 19 illustrates examples of channel configurations, in accordance with aspects presented herein.

In another example, the channel may be formed in the base plate 302 rather than in the base portion 802 of the modular clip 304. FIG. 18A illustrates an example showing channels 1820 formed in base plate 302. The channels may be positioned to communicate with the opening 820 configured in the modular clip 304. Once the modular clip is fastened to the base plate, the channels may function similar to the channels 820 formed in the modular clip. In another example, the channels may be formed in both the modular clip 304 and the base plate 302, e.g., as illustrated in FIG. 18B. The channels may be formed to align, as illustrated in FIG. 18B. In another example, the channels in the base plate may be parallel to the channels in the modular clip. In another example, the channels in the base plate may be configured to intersect the channels in the modular clip. FIG. 19 illustrates an example base plate 302 and modular clip configuration showing various examples of channel configuration. As illustrated in the various examples in FIG. 19, the channels for the vent feature may be configured to extend in various directions. For example, channels 1902 and 1904 are illustrated as extending in a direction that crosses rows of modular clips 304. As illustrated with 1904, the channels may at an angle relative to the sides of the base plate. FIG. 19 illustrates an example in which the channel 1906 may extend in the same direction as a single modular clip 304. The battery module may be configured to include channels in the base plate that intersect channels formed in the modular clip.

Example aspects of the present invention have now been described in accordance with the above advantages. It will be appreciated that these examples are merely illustrative of aspects of the present invention. Many variations and modifications will be apparent to those skilled in the art.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Furthermore, relative terms such as "lower," "bottom," "top," "upper," etc. may be used to describe an element's relationship to another element, as illustrated in the examples in the drawings. It will be understood that relative terms are intended to encompass different orientations of an apparatus in addition to the orientation depicted in the drawings. By way of example, if an apparatus in the drawings is turned over, elements disclosed as being on the "bottom" or "lower" would be on the "top" or "upper" and elements described as being on the "top" or "upper" would be on the "bottom" or "lower." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A modular clip for a battery module configured to receive a plurality of battery cells, the modular clip comprising:
   a base portion configured to receive a plurality of battery cells;
   a plurality of openings in the base portion, wherein each opening is configured to extend around a bottom vent of a battery cell that the modular clip is configured to receive; and
   a plurality of open-end channels formed in the base portion, each open-end channel having a first opening at a first side of the modular clip, each of the plurality of openings having at least one open-end channel extending from the corresponding opening to the first opening at the first side of the modular clip.

2. The modular clip of claim 1, wherein each open-end channel is configured to direct heat or gas escaping from the bottom vent of the battery cell to vent away from an interior of the modular clip and out the open edge of the modular clip.

3. The modular clip of claim 1, wherein the modular clip extends in a linear direction, and wherein each of the plurality of open-end channels extends in a direction perpendicular to the linear direction.

4. The modular clip of claim 1, wherein the plurality of open-end channels are configured to align with a second plurality of open-end channels of a second, matching modular clip when the modular clip is positioned on a base plate beside the second modular clip to form a combined open-end channel that extends under both modular clips.

5. The modular clip of claim 1, wherein the base portion comprises a plurality of cell recesses, wherein each cell recess is configured to receive and surround a portion of a respective battery cell.

6. The modular clip of claim 5, wherein the plurality of the openings in the base portion are aligned with the plurality of cell recesses.

7. The modular clip of claim 5, further comprising:
   a rim formed in each of the plurality of cell recesses, wherein each rim surrounds one of the plurality of openings.

8. The modular clip of claim 7, wherein the modular clip is configured to be positioned against a base plate, wherein the base of the modular clip is configured to space the rim formed in each of the plurality of cell recesses from the base plate to form a cavity, and wherein the open-end channel crosses the cavity.

9. The modular clip of claim 5, wherein each of the plurality of cell recesses is configured to receive a cylindrical battery cell having a circular bottom vent of a first diameter, and wherein each of the plurality of openings comprises a second diameter that is larger than the first diameter of the circular bottom vent.

10. The modular clip of claim 1, further comprising:
    the plurality of battery cells positioned within the modular clip.

11. A battery module for a battery pack assembly, the battery module comprising:
    a base plate; and
    a plurality of modular clips coupled to the base plate, each modular clip including:
        a base portion configured to receive a plurality of battery cells; and
        a plurality of openings in the base portion, wherein each opening is configured to extend around a bottom vent of a battery cell that the modular clip is configured to receive; and
    a plurality of open-end channels formed in at least one of the base portion of the modular clip or the base plate, each open-end channel having a first opening at a first side of the modular clip, each of the plurality of openings having at least one open-end channel extending from the corresponding opening to the first opening at the first side of the modular clip.

12. The battery module of claim 11, wherein each open-end channel of a modular clip is configured to direct heat or gas escaping from the bottom vent of a battery cell to vent away from an interior of the modular clip and out of the battery module.

13. The battery module of claim 11, wherein each of the plurality of modular clips extend in a linear direction, and wherein each of the plurality of open-end channels extends in a direction perpendicular to the linear direction.

14. The battery module of claim 11, wherein the plurality of open-end channels are formed in the base portion of each of the modular clips, and the plurality of open-end channels are configured to align for each of the plurality of modular clips coupled to the base plate to form a combined open-end channel that extends under each of the modular clips.

15. The battery module of claim 14, wherein the base plate comprises a positioning mechanism for positioning the plurality of modular clips against the base plate for alignment of the plurality of open-end channels of different modular clips to form the combined open-end channel that extends under each of the modular clips.

16. The battery module of claim 11, wherein the base portion of a modular clip comprises a plurality of cell recesses, wherein each cell recess is configured to receive and surround a portion of a respective battery cell from the plurality of battery cells.

17. The battery module of claim 16, wherein each of the plurality of modular clips further comprises:
a rim formed in each of the plurality of cell recesses, wherein each rim surrounds one of the plurality of openings.

18. The battery module of claim 17, wherein for each modular clip the base portion is configured to space the rim from the base plate to form a cavity, and wherein at least one open-end channel crosses the cavity.

19. The battery module of claim 17, wherein each of the plurality of modular clips further comprises:
the plurality of battery cells positioned within each of the modular clips; and
an adhesive applied between the rim and a battery cell received in a corresponding cell recess.

20. The battery module of claim 11, further comprising:
the plurality of battery cells positioned within each of the modular clips.

21. A battery pack comprising:
a plurality of battery modules, each battery module including:
a base plate; and
a plurality of modular clips coupled to the base plate, each modular clip including:
a base portion configured to receive a plurality of battery cells; and
a plurality of openings in the base portion, wherein each opening is configured to extend around a bottom vent of a battery cell that the modular clip is configured to receive; and
a plurality of open-end channels formed in at least one of the base portion of the modular clip or the base plate, each open-end channel having a first opening at a first side of the modular clip, each of the plurality of openings having at least one open-end channel extending from the corresponding opening to the first opening at the first side of the modular clip.

22. The battery pack of claim 21, wherein each open-end channel of a modular clip is configured to direct heat or gas escaping from the bottom vent of a battery cell to vent away from an interior of the modular clip and out of the battery module.

23. The battery pack of claim 21, wherein each of the plurality of modular clips extend in a linear direction, and wherein each of the plurality of open-end channels extends in a direction perpendicular to the linear direction.

24. The battery pack of claim 21, wherein the plurality of open-end channels are formed in the base portion of each of the modular clips, and the plurality of open-end channels are configured to align for each of the plurality of modular clips coupled to the base plate to form a combined open-end channel that extends under each of the modular clips.

25. The battery pack of claim 21, wherein the base portion of a modular clip comprises a plurality of cell recesses,
wherein each cell recess is configured to receive and surround a portion of a respective battery cell that the modular clip is configured to receive and comprises a rim formed in each of the plurality of cell recesses, wherein each rim surrounds one of the plurality of openings.

26. The battery pack of claim 25, wherein for each modular clip the base portion is configured to space the rim from the base plate to form a cavity, and wherein at least one open-end channel crosses the cavity.

27. The battery pack of claim 21, further comprising:
the plurality of battery cells positioned within each modular clip.

28. The modular clip of claim 1, further comprising:
a first wall and a second wall extending from the base portion along a length of the modular clip, wherein the plurality of battery cells are received between the first wall and the second wall.

29. The modular clip of claim 1, wherein each of the plurality of open-end channels comprises a second opening at a second side of the modular clip opposite the first side, wherein each open-end channel is configured to vent heat or gas escaping from the bottom vent of the battery cell out of the first opening and the second opening.

* * * * *